(12) United States Patent
Alexander et al.

(10) Patent No.: US 12,399,837 B2
(45) Date of Patent: Aug. 26, 2025

(54) TRANSLATION LOOKASIDE BUFFER (TLB) PREFETCHER WITH MULTI-LEVEL TLB PREFETCHES AND FEEDBACK ARCHITECTURE

(71) Applicant: SiFive, Inc., San Mateo, CA (US)

(72) Inventors: Benoy Alexander, Cedar Park, TX (US); John Ingalls, Sunnyvale, CA (US); Mohit Gopal Wani, Sunnyvale, CA (US)

(73) Assignee: SiFive, Inc., Santa Clara, CA (US)

( * ) Notice: Subject to any disclaimer, the term of this patent is extended or adjusted under 35 U.S.C. 154(b) by 20 days.

(21) Appl. No.: 18/203,186

(22) Filed: May 30, 2023

(65) Prior Publication Data

US 2023/0418763 A1     Dec. 28, 2023

Related U.S. Application Data

(60) Provisional application No. 63/356,075, filed on Jun. 28, 2022.

(51) Int. Cl.
*G06F 12/10*     (2016.01)
*G06F 12/1036*     (2016.01)

(52) U.S. Cl.
CPC .... *G06F 12/1036* (2013.01); *G06F 2212/681* (2013.01); *G06F 2212/684* (2013.01)

(58) Field of Classification Search
CPC ........... G06F 12/1036; G06F 2212/681; G06F 2212/684; G06F 12/1027; G06F 2212/1024; G06F 2212/502; G06F 2212/6026; G06F 2212/654
See application file for complete search history.

(56) References Cited

U.S. PATENT DOCUMENTS

| | | | |
|---|---|---|---|
| 9,286,184 B1 * | 3/2016 | Collard | G06F 11/3466 |
| 2020/0226492 A1 * | 7/2020 | Madani | G06N 3/08 |
| 2020/0401524 A1 * | 12/2020 | Sundaram | G06F 9/3824 |
| 2022/0091986 A1 * | 3/2022 | Kotra | G06F 9/3804 |
| 2022/0309001 A1 * | 9/2022 | Campbell | G06F 12/0862 |

* cited by examiner

*Primary Examiner* — Masud K Khan
(74) *Attorney, Agent, or Firm* — Kilpatrick Townsend & Stockton LLP

(57) ABSTRACT

Described is a translation lookaside buffer (TLB) prefetcher with multi-level TLB prefetches and feedback architecture. A processing system includes two or more translation lookaside buffer (TLB) levels, each TLB level including a miss queue, and a TLB prefetcher connected to each of the two or more TLB levels. The TLB prefetcher configured to receive feedback from the miss queue at each TLB level for previously sent TLB prefetches and control number of TLB prefetches sent for a trained TLB entry to each TLB level of the two or more TLB levels based on the feedback.

21 Claims, 8 Drawing Sheets

TRANSLATION LOOKASIDE BUFFER (TLB) PREFETCHER WITH MULTI-LEVEL TLB PREFETCHES AND FEEDBACK ARCHITECTURE

CROSS REFERENCE TO RELATED APPLICATION

This application claims priority to and the benefit of U.S. Provisional Patent Application Ser. No. 63/356,075, filed on Jun. 28, 2022, the entire disclosure of which is hereby incorporated by reference.

TECHNICAL FIELD

This disclosure relates to a translation lookaside buffer (TLB) prefetcher.

BACKGROUND

A translation lookaside buffer (TLB) is a memory cache that stores the recent translations of virtual memory to physical memory in respective TLB entries or page table entries (PTEs) (collectively "PTEs"). The TLB can be implemented, for example, as an address-translation cache or a content-addressable memory (CAM). If a TLB demand or TLB demand request (collectively a "TLB demand request") results in a PTE match in the TLB, the retrieved physical address can be used to access memory. This is a TLB hit. A TLB hit provides memory access in a reduced amount of time in contrast to having to through a page walk or translation process. If the address in the TLB demand request is not in the TLB, it is a TLB miss. In the event of a TLB miss, a higher level TLB can be checked, a page table walker (PTW) can be instructed to perform a page walk, and/or combinations thereof to obtain the PTE. A page walk is a time consuming process, which requires reading the contents of multiple memory locations, computing the physical address, and storing the virtual address to physical address mapping in the TLB. Minimizing the number of TLB misses improves processor efficiency.

A TLB prefetcher aims to prefetch and populate the TLB ahead of the TLB demand miss request. That is, a TLB prefetcher is used to retrieve PTE(s) into the TLB prior to being used by a core, to improve the throughput of the core. The TLB prefetcher performs accesses to memory based on patterns of TLB demand requests made by the core. The accesses may be specific to a hardware thread of an application executing in the core. For example, if a hardware thread is accessing or reading every $4^{th}$ kilobyte of a large array and the accesses are missing in a level 1 (L1) TLB, the TLB prefetcher will detect these misses. A TLB hierarchy with multiple levels of TLBs can be used to reduce overall access time to the array and improve the performance of the application. The TLB prefetcher can monitor multiple access streams per hardware thread. A data or access stream consists of a base address and a stride between memory addresses. TLB prefetches are automatically issued to the memory system when possible.

SUMMARY

Disclosed herein are methods and devices for a TLB prefetcher with multi-level TLB prefetches and feedback architecture.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
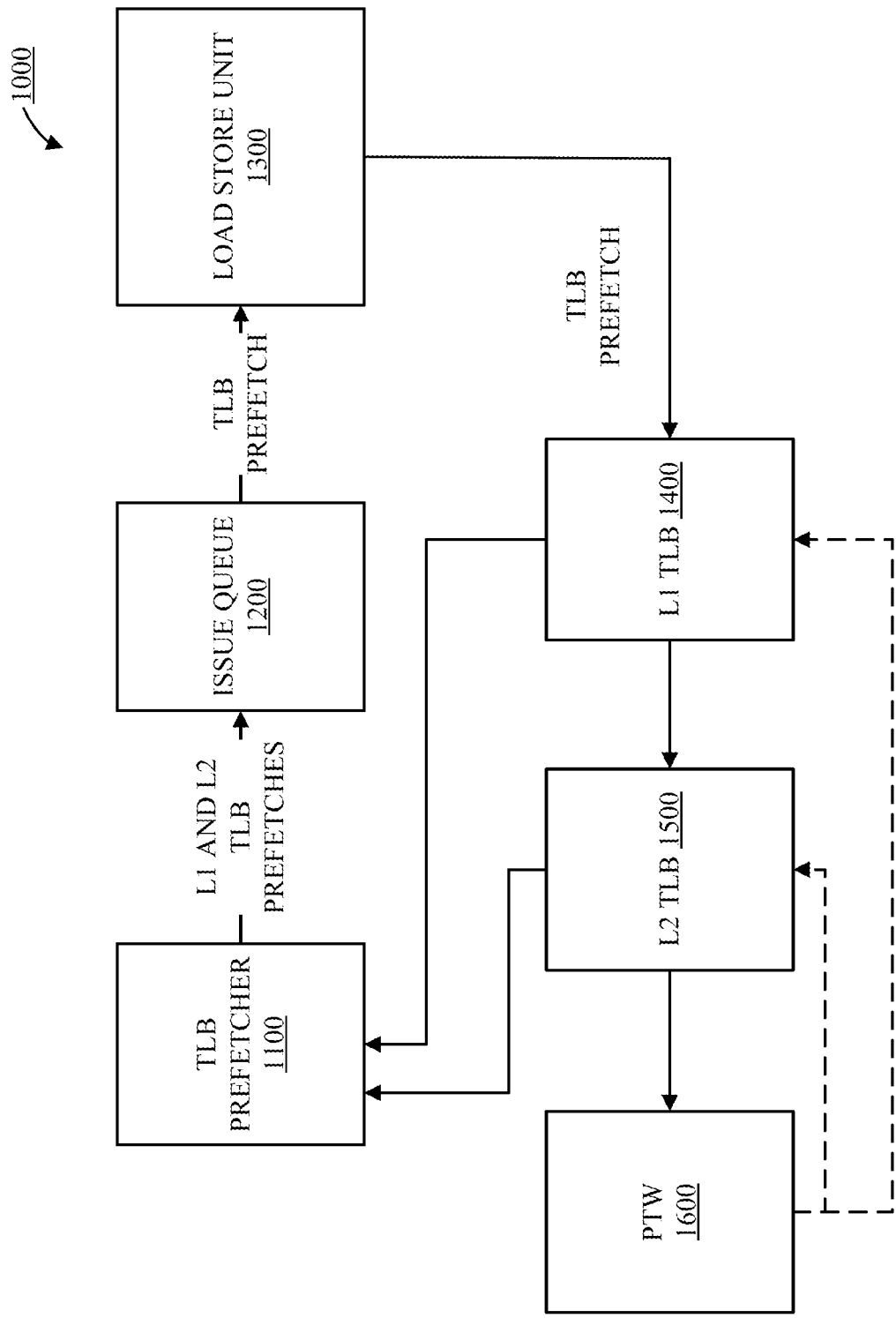
FIG. 1 is a block diagram showing an example of a microarchitecture for a processing system with a TLB prefetcher.

Described herein is a TLB prefetcher with multi-level prefetches and feedback architecture. A TLB prefetch is an attempt to obtain a predicted PTE from a specific TLB that has not yet been requested. The TLB prefetcher is a hardware prefetcher or a TLB hardware prefetcher which enables memory level parallelism and hides memory latency. The TLB prefetcher is a region-based sequential stride prefetcher or a window based prefetcher. For example, in a window based prefetcher, a window is a contiguous memory block having a base address and a stride determined from demand requests such as demand load requests. The base address is the midpoint of the window and the stride is divided between a backward looking direction and a forward looking direction. The base address slides in the window as the demand stream and/or prefetch stream moves through the contiguous memory block. The TLB prefetcher can include multiple entries, where each entry is responsible for a prefetch stream. Each entry has its own window defined by a base address and stride.

The TLB prefetcher trains on pattern detection of TLB demand requests. For example, the TLB prefetcher receives a first L1 TLB demand request having a page which consists of a region virtual address and a region offset. In implementations, the page size can be 4 kilobytes, 2 megabytes, 1 gigabyte, for example. The TLB prefetcher receives a second L1 TLB demand request and calculates a stride based on the current address (from the second L1 TLB demand request) and the previous address (from the first L1 TLB demand request). The TLB prefetcher receives a third L1 TLB demand request which confirms the stride. The TLB prefetcher can start generating N L1 TLB prefetch requests, where N is the prefetch degree or distance and can be either statically programmed or dynamically adjusted with a programmable maximum cap.

The TLB prefetcher can work with TLB miss queues associated with each TLB, where each TLB miss queue entry tracks a pending TLB miss or what PTE is being requested from higher levels of TLB s and memory. On a TLB miss, the miss queue entries can be checked to see if the same PTE request is currently pending from prior PTE requests. For a matching miss queue entry, the PTE request can be merged into the matching miss queue entry, foregoing a duplicative issue. In the event of no matches, a new miss queue entry can be reserved for the PTE request.

Each L1 TLB prefetch request establishes or merges with a miss queue entry as described and sends a request to a downstream TLB hierarchy. The TLB prefetcher sends prefetches that either go to L1 TLB miss queues or L2 TLB miss queues directly depending on a microarchitectural state of the TLB prefetcher as described herein. In a steady state, TLB prefetcher operation results in hitting in the L1 TLB for each TLB demand, hitting in the L2 TLB for each L1 TLB prefetch, and sending a L1 TLB prefetch and a L2 TLB prefetch for each confirmation of a TLB demand, where the confirmation is feedback from the L1 miss queue that a TLB prefetcher entry is operating well. The confirmation indicates that a TLB demand matches a pending TLB prefetch.

FIG. 1 is a block diagram showing an example of a microarchitecture flow for a processing system 1000. The processing system 1000 can include a TLB prefetcher 1100 connected to or in communication with (collectively "connected to") a prefetch issue or issue queue 1200, which in turn is connected to a load-store unit 1300. The load store unit 1300 is connected to a L1 TLB 1400, which in turn is connected to a L2 TLB 1500. The L2 TLB 1500 is connected to a page table walker (PTW) 1600. The L1 TLB 1400 and the L2 TLB 1500 are further connected to the TLB prefetcher 1100. Although FIG. 1 describes and illustrates L1 TLB and L2 TLB prefetches, it is applicable and extendable to higher level TLBs in a TLB hierarchy without departing from the scope of the specification or claims.

Operationally, the TLB prefetcher 1100 with a trained entry can send a L1 TLB prefetch and a L2 TLB prefetch to the prefetch issue queue 1200 upon the TLB prefetcher 1100 receiving a confirmation(s) for a TLB demand(s) from a L1 TLB miss queue entry. That is, the L1 TLB prefetch and the L2 TLB prefetch are generated on-the-fly upon receiving the confirmation in contrast to being pregenerated. As described herein, the TLB prefetcher 1100 can skip sending TLB prefetches when needed to prevent unnecessary transactions. A confirmation is when a prefetch request is later confirmed with a TLB demand access to the same PTE. As described herein, each trained entry in the TLB prefetcher 1100 is trained with respect to the L1 TLB, L2 TLB, and higher level TLBs. The TLB prefetcher 1100 can therefore, for example, send L1 and L2 TLB prefetches for the same trained entry. The issue queue 1200 can send a next TLB prefetch in queue to the load-store unit 1300. The load-store unit 1300 can send the L1 TLB prefetches to the L1 TLB 1400. The L1 TLB 1400 can send a request to the L2 TLB 1500 in the event of a L1 TLB miss and the L2 TLB 1500 can send a request to the PTW 1600 in the event of a L2 TLB miss, as is described herein.

The TLB prefetcher 1100 also uses miss queue feedback, which indicates whether TLB prefetches are hitting in any established miss queue entries and whether TLB demands from the load-store unit 1300 or core are hitting in any established miss queue entries. The miss queue feedback can be used by the TLB prefetcher 1100 to control and manage the sending of TLB prefetches. A confirmation is a type of miss queue feedback. Other types of miss queue feedback are described herein.

In implementations, the prefetch issue queue 1200 can be used to replay a TLB prefetch from the prefetch issue queue if miss queues are exhausted while the TLB prefetch is in the load-store unit 1300 or prior to completion of sending the TLB prefetch, where miss queue fullness or exhaustion is a type of miss queue feedback. In implementations, the prefetch issue queue 1200 can enable the TLB prefetcher 1100 to replay a TLB prefetch if there is a miss in the page table cache, a miss in view of a resource check, or a miss in view of a hazard check prior to completion of sending the TLB prefetch. For example, if an L1 TLB prefetch is sent out when there is a miss queue available, but while in flight, the available miss queue is taken by another L1 TLB prefetch. In this instance, the TLB prefetcher 1100 can convert the L1 TLB prefetch to an L2 TLB prefetch on-the-fly and/or replay the L1 TLB prefetch from the prefetch issue queue 1200.

In implementations, an issue queue injection or priority request can be used by the TLB prefetcher 1100 to insert a TLB prefetch into the queue. TLB demands have priority over TLB prefetches. Prefetches are nominally used to fill the gaps in the queue. The TLB prefetcher 1100 can send an issue queue injection or priority request for a TLB prefetch to override the normal priority to obtain a slot in the queue.

In implementations, the prefetch issue queue 1200 can have a defined number of slots, a defined number of slots for L1 TLB prefetches, and a defined number of slots for L2 TLB prefetches. The number of slots can vary as between the L1 TLB prefetches and the L2 TLB prefetches.

Ideally, the TLB prefetch stream is ahead of the TLB demand stream so that during steady state TLB prefetcher operation each TLB demand hits in the L1 TLB and each L1 TLB prefetch hits in the L2 TLB. The TLB prefetcher 1100 uses feedback indicating positive reinforcement from the L1 miss queues, or combinations thereof to increase a prefetch-distance used by the TLB prefetcher 1100, where the prefetch-distance is how far ahead the TLB prefetches are relative to the TLB demand stream. Since there are a limited number of L1 miss queue entries in the L1 TLB, the TLB prefetcher 1100 uses both L1 miss queues and L2 miss queues to meet the prefetch-distance. The TLB prefetcher 1100 can use different feedback mechanisms to tune which L1 miss queues and L2 miss queues to use, throttle sending of specific TLB prefetches, track long streams, track multiple streams, prefetch from multiple streams, and prefetch from multiple levels of a TLB hierarchy.

Figure 2:
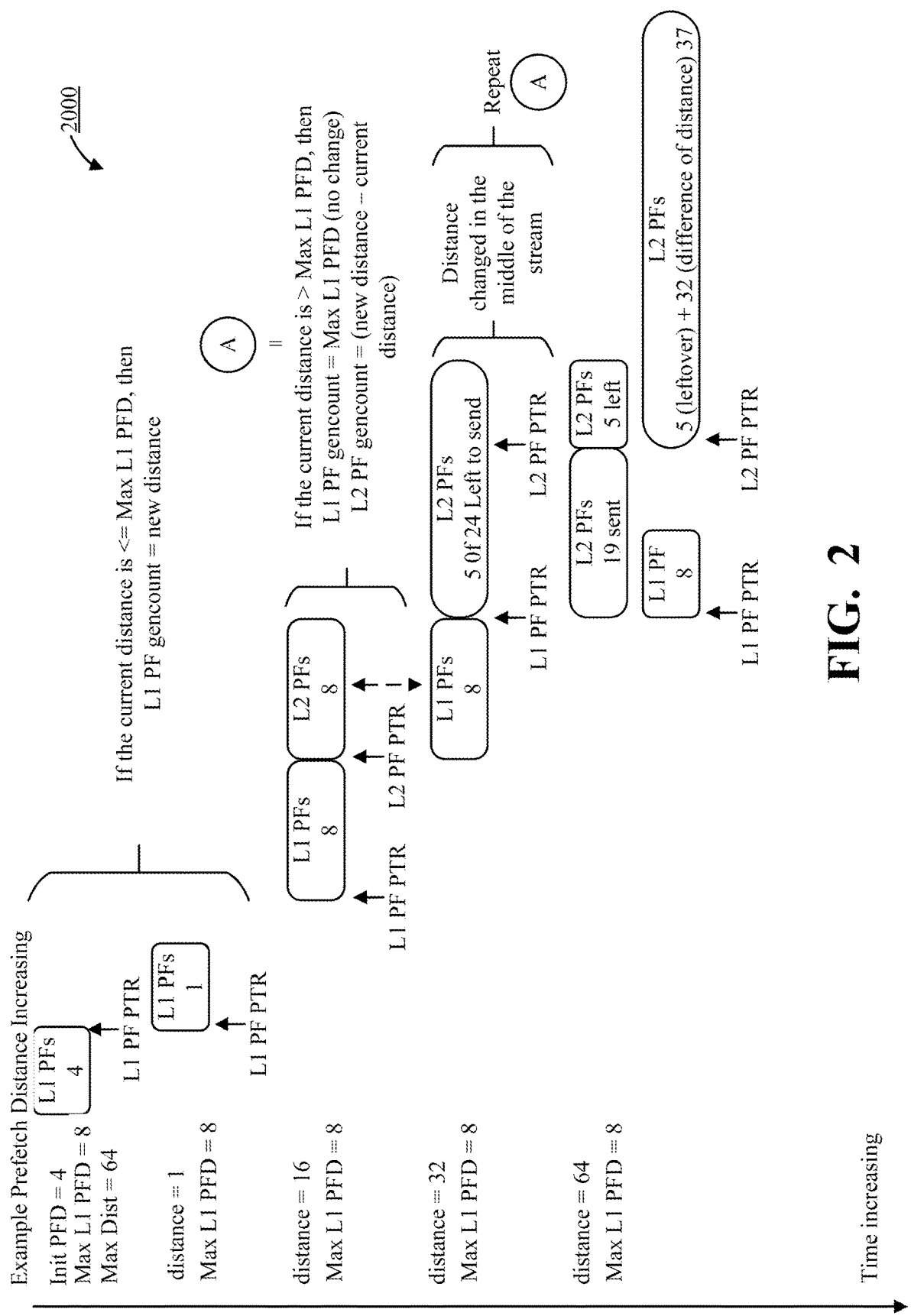
FIG. 2 is a block diagram showing an example of a TLB prefetcher sending L1 TLB and L2 TLB prefetches.

FIG. 2 is a block diagram showing an example flow 2000 of how a TLB prefetcher, such as TLB prefetcher 1100, can send dual L1 and L2 TLB prefetches. The TLB prefetcher can use a L1 TLB prefetch pointer (L1 PF PTR) and a L2 TLB prefetch pointer (L2 PF PTR) to indicate an address of the last L1 TLB prefetch and L2 TLB prefetch sent by the TLB prefetcher, respectively. The TLB prefetcher can also use generate-prefetch counters, a L1 PF gencount and a L2 PF gencount, to indicate how many TLB prefetches ahead each of the respective pointers can be.

In the flow 2000 example, the distance for a trained entry in the TLB prefetcher is being aggressively increased over time as a result of confirmations received by the TLB prefetcher. As illustrated, each of the L1 PF gencount and the L2 PF gencount are updated as the distance is increased over time.

Once an entry in the TLB prefetcher is trained, certain parameters are set to default values using, for example, configuration status registers. In this instance, an initial distance is set to 4, a maximum L1 prefetch-distance is set to 8, and a maximum distance is set to 64.

The TLB prefetcher starts with L1 miss queues. The L1 PF gencount is set to 4, which is the initial distance. The TLB prefetcher starts generating TLB prefetches from the L1 PF PTR. Relationally, the TLB demand stream is to the left of the L1 PF PTR as a TLB prefetch stream is supposed to be ahead of the TLB demand stream. At this time, the TLB prefetcher is attempting to get 8 TLB prefetches ahead of the TLB demand stream. The L1 PF gencount is decremented as the TLB prefetcher starts generating and sending the L1 TLB prefetches.

As time progresses, the distance (which was initially set to 1), is now set to 16 based on confirmations and miss queue feedback received from L1 miss queues, L2 miss queues, or combinations thereof. Consequently, the L1 PF PTR, the L2 PF PTR, the L1 PF gencount, and the L2 PF gencount have to be updated. Remember that there are a limited number of L1 miss queues (for example 8) and therefore the maximum L1 prefetch-distance is set to 8. The L1 PF gencount is therefore set to 8. However, the distance is set to 16. Therefore, the L2 PF gencount is set to 8 (i.e., new distance (16)—current distance (8)). That is, the TLB prefetcher will now generate 8 L2 TLB prefetches with the L2 PF PTR starting at the L1 PF PTR plus 8 L1 TLB prefetches. As time progresses, the TLB prefetcher pulls or merges the L2 miss queue entries into the L1 miss queue. This is illustrated by the double ended dashed arrow between rows 3 and 4, where the L1 PF PTR is now at the end of the original L2 prefetches in row 4.

As time progresses, the distance (which was 16), is now set to 32 based on confirmations and miss queue feedback. In this instance, there are no more L1 miss queue entries available. However, there are still L2 miss queue entries available. The L2 PF gencount is therefore set to 24. The TLB prefetcher starts sending the remaining 24 TLB prefetches as L2 TLB prefetches (i.e., 32-8). However, the distance changes to 64 after the TLB prefetcher has sent 19 L2 TLB prefetches. The L1 miss queue entries are still not available. Consequently, the L2 PF gencount is set to 37 (5 left+(64-32)).

Sending of dual L1 and L2 TLB prefetches is enabled by the TLB prefetcher using the same state machine to train an entry and send TLB prefetches for or from the entry.

Figure 3:
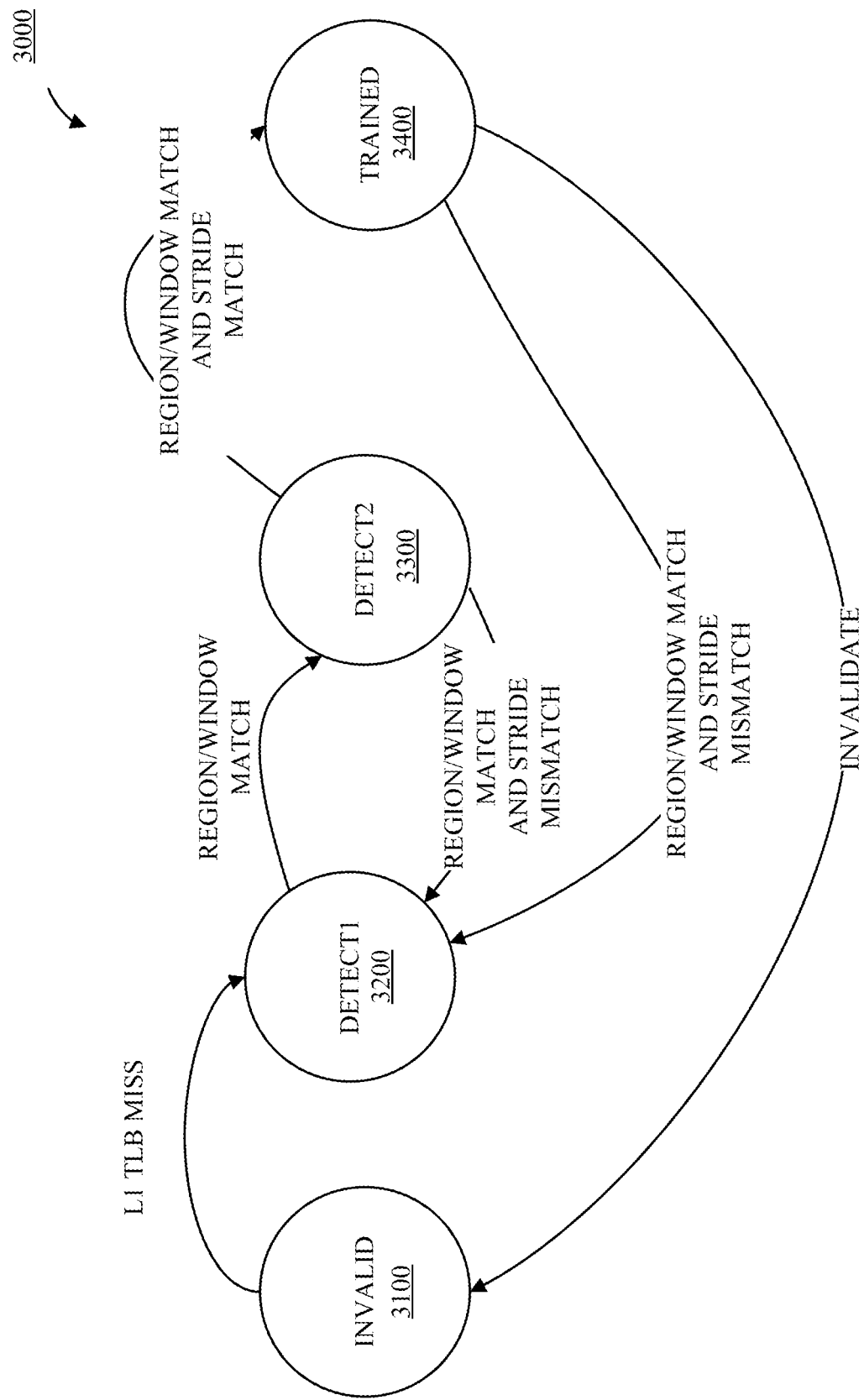
FIG. 3 is a diagram showing an example state machine for a TLB prefetcher.

FIG. 3 is a diagram showing an example state machine 3000 for a TLB prefetcher or a TLB hardware prefetcher. The state machine 3000 can include an invalid state 3100, a detect1 state 3200, a detect2 state 3300, and a trained state 3400. The TLB prefetcher can allocate an entry when a first TLB demand misses in a L1 TLB, for example. In this instance, it is assumed that the first TLB demand does not match an existing entry, i.e., a TLB entry or PTE. Allocation of the entry can be based on a variety of policies. For example, the allocation policy can look for and allocate the lowest index invalid entry. If all entries are valid, then look for an untrained entry using a pseudo-least recently used (PLRU) algorithm. If all entries are valid and in a trained state, look for an entry using the PLRU algorithm. The window for the entry is set based on the first TLB demand. The state machine 3000 moves from the invalid state 3100 to the detect1 state 3200.

The TLB prefetcher determines whether a second TLB demand which missed in the L1 TLB falls in the window. If the second TLB demand falls within the window, a stride is determined from the address in the second TLB demand and the address in the first TLB demand. The state machine 3000 moves from the detect1 state 3200 to the detect2 state 3300. The window slides over such that the second TLB demand is the center of the window.

The TLB prefetcher determines whether a third TLB demand which missed in the L1 TLB falls in the window and matches the stride. If the third TLB demand falls within the window and matches the stride, the state machine 3000 moves from the detect2 state 3300 to the trained state 3400. The entry in the trained state is trained with respect to the L1 TLB and higher level TLB s in contrast to having to train the entry for each TLB level. When the entry is in the trained state, the TLB prefetcher generates a programmable number of TLB prefetches. If the programmable number of TLB prefetches exceeds the maximum number of TLB prefetches that can be sent as L1 TLB prefetches (a programmable number), then L2 TLB prefetches are sent once the L1 TLB prefetches are sent. In the event that L1 miss queues are full before completing the sending of the L1 TLB prefetches, then L2 TLB prefetches can be sent opportunistically. If the third TLB demand falls within the window and mismatches the stride, the state machine 3000 moves from the trained state 3400 to the detect1 state 3200. Again, the window slides over such that the third TLB demand is the center of the window.

During the trained state 3400, if a subsequent TLB demand which missed in the L1 TLB falls within the window and matches the stride, an additional one L1 TLB prefetch and one L2 TLB prefetch are sent out. In this instance, as the TLB demand stream pointer moves, L1 and L2 TLB prefetch pointers are also moved to maintain how far ahead each of the L1 and L2 TLB prefetch pointers are from the TLB demand stream. Consequently, one more L1 TLB demand prefetch and one more L2 TLB demand prefetch are sent.

During the trained state 3400, if the subsequent TLB demand which missed in the L1 TLB falls within the window and mismatches the stride, the state machine 3000 may move from the trained state 3400 to the detect1 state 3200 depending on how many stride mismatches can be forgiven (a programmable number) as described herein. That is, if forgiveness is enabled and still has credits for a trained entry, then the state machine 3000 will stay in the trained state 3400. During the trained state 3400, the state machine goes to the invalid state 3100 when the respective entry is invalidated due to TLB feedback, for example, or the respective entry is evicted using a replacement policy. A round-robin pick policy can be used when multiple TLB prefetch entries are generating TLB prefetches.

The state machine includes logic to track the interplay between L1 TLB prefetches and L2 TLB prefetches. This includes, but is not limited to, what was the last L1 TLB prefetch sent, what was the last L2 TLB prefetch sent, how many L1 TLB prefetches have been sent, how many L2 TLB prefetches have been sent, L1 TLB prefetch-distance, L2 TLB prefetch-distance, L1 miss queue fullness count, and L2 miss queue fullness count. The state machine can track and determine when to send L1 TLB prefetches, L2 TLB prefetches, switch between sending L1 TLB prefetches and L2 TLB prefetches, and pull a page(s) and/or entries from a L2 miss queue to the L1 miss queue.

Figure 4:
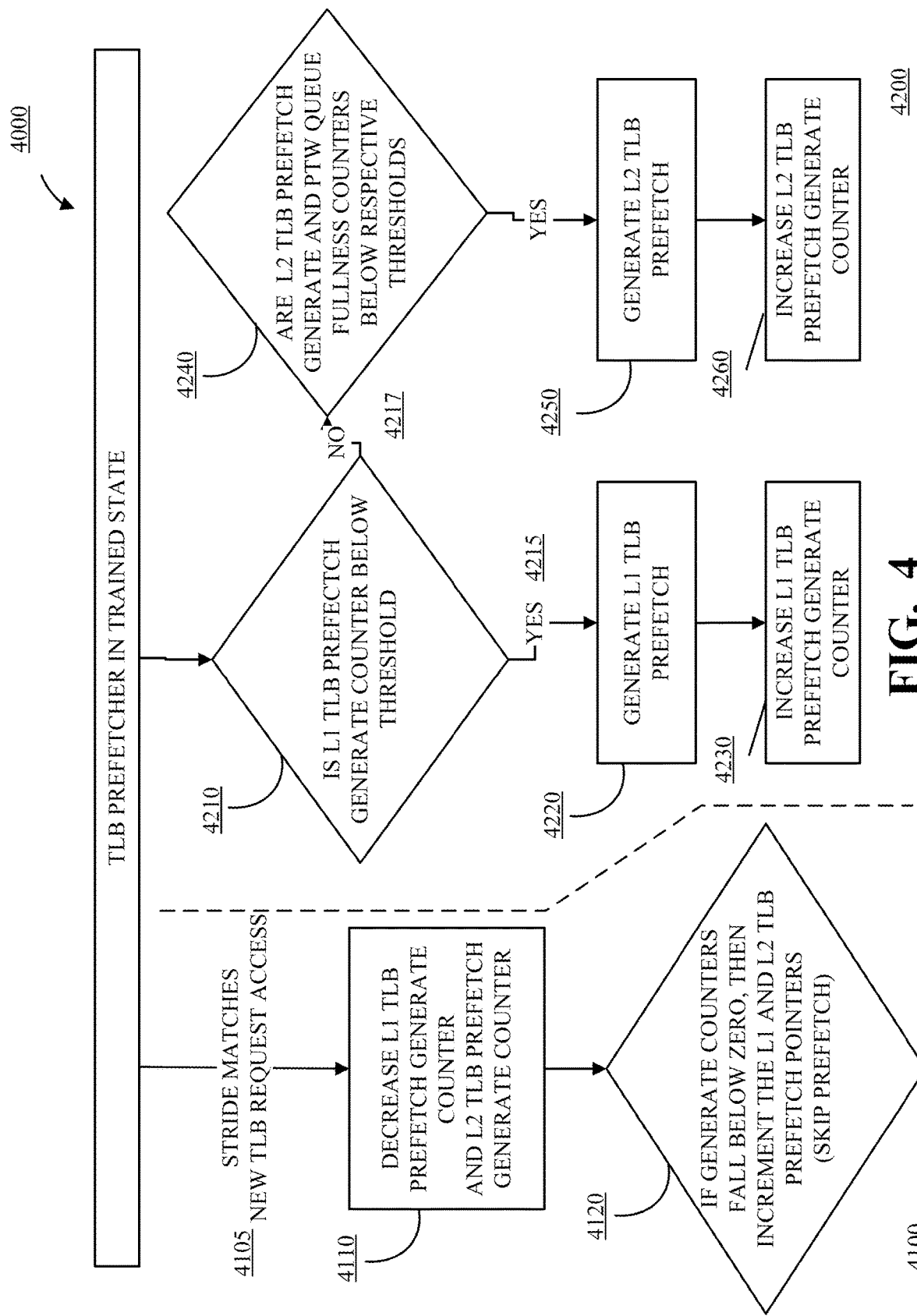
FIG. 4 is a flowchart of an example method for TLB prefetcher operation in the trained state.

FIG. 4 is a flowchart of an example method 4000 for TLB prefetcher operation in the trained state. The method 4000 uses a L1 TLB prefetch generate counter and a L2 TLB prefetch generate counter to show how far ahead of the TLB demand stream the respective TLB prefetches are. The method 4000 uses a L1 TLB prefetch generate threshold and a L2 TLB prefetch generate threshold to determine how far ahead (i.e., prefetch-distance) the respective TLB prefetches should be relative to the TLB demand stream. The L1 TLB prefetch generate threshold and a L2 TLB prefetch generate threshold can have different values. The L1 TLB prefetch generate threshold and a L2 TLB prefetch generate threshold can change dynamically dependent on prefetcher aggressiveness by changing the prefetch-distance. The method 4000 uses a L1 TLB fullness threshold and a L2 TLB fullness threshold to determine whether there is available space in the respective miss queues. The method 4000 uses a L1 TLB pointer and a L2 TLB pointer to indicate the last respective TLB prefetch address and can be incremented or decremented depending on stride.

The method 4000 includes a confirmation path 4100 and an arbitration path 4200. The confirmation path 4100 can confirm that a trained entry in the prefetcher is still valid based on TLB demand request(s) having stride matches. The arbitration path 4200 can determine whether to send a L1 TLB prefetch or a L2 TLB prefetch depending on the respective counters and thresholds. As described herein, the TLB prefetcher operates to increase the counts in the L1 TLB prefetch generate counter and the L2 TLB prefetch generate counter to reach the L1 TLB prefetch generate threshold and the L2 TLB prefetch generate threshold, respectively.

In the confirmation path 4100, the method 4000 includes decreasing the L1 TLB prefetch generate counter and the L2 TLB prefetch generate counter (4110) when a TLB demand request matches a stride for the applicable trained entry (4105). The method 4000 includes incrementing (or decrementing depending on the implementation) a position of the L1 TLB pointer and the L2 TLB pointer if the L1 TLB prefetch generate counter and the L2 TLB prefetch generate counter fall below zero (4200). In this instance, the TLB prefetch is skipped.

In the arbitration path 4200, the method 4000 includes determining if the L1 TLB prefetch generate counter is below the L1 TLB prefetch generate threshold and if the L1 miss queue fullness counter is below the L1 TLB fullness threshold (4210). The method 4000 includes generating a L1 TLB prefetch (4220) if the L1 TLB prefetch generate counter is below the L1 TLB prefetch generate threshold and if the L1 miss queue fullness counter is below the L1 TLB fullness threshold (4215). The method 4000 includes increasing the L1 TLB prefetch generate counter after generating the L1 TLB prefetch (4230). The determination if the L2 TLB prefetch generate counter is below the L2 TLB prefetch generate threshold and if the L2 miss queue fullness counter is below the L2 TLB fullness threshold (4240) is done if the L1 TLB prefetch generate counter is equal to or above the L1 TLB prefetch generate threshold or if the L1 miss queue fullness counter is equal to or above the L1 TLB fullness threshold (4217). The method 4000 includes generating a L2 TLB prefetch (4250) if the L2 TLB prefetch generate counter is below the L2 TLB prefetch generate threshold and if the L2 miss queue fullness counter is below the L2 TLB fullness threshold (4215). The method 4000 includes increasing the L2 TLB prefetch generate counter after generating the L2 TLB prefetch (4260). In implementations, no TLB prefetches are sent if the L2 TLB prefetch generate counter is equal to or above the L2 TLB prefetch generate threshold or if the L2 miss queue fullness counter is equal to or above the L2 TLB fullness threshold. In implementations, a TLB prefetch can be sent to higher level TLBs including L3 and above.

As noted, and described herein, the L1 miss queues and L2 miss queues vary in size and are configurable. Fullness or an indication of how many miss queues have been allocated (or available) is provided as feedback by the miss queues in the respective TLBs. In implementations, the fullness feedback can be provided by a N bit field, where a value indicates the fullness of the miss queue. For example, if N is a 4 bit field, then a value of 8 from the miss queue would indicate half-full (or empty). This value could then be compared against a configurable fullness threshold to determine whether additional TLB prefetches can be sent. This allows the interface and values indications to stay the same even if the implementation configures a different number of miss queues. The fullness indicator is a relative indicator allowing the TLB prefetcher to be uninformed of an absolute size of the miss queue at each TLB level.

As noted, and described herein, the TLB prefetcher, including the state machine, can use different feedback mechanisms to tune which L1 miss queues and L2 miss queues to use, throttle sending of specific TLB prefetches, and invalidating entries. This can be implemented using counters for the miss queue feedback and TLB feedback, and configurable thresholds for each of the counters. For example, multiple features of the TLB prefetcher and the issue queue are configurable, including but not limited to, the number of TLB prefetch streams that the TLB prefetcher can track, initial or default prefetch-distance, maximum allowed prefetch-distance, prefetch-distance aggressiveness thresholds, entry eviction thresholds, issue queue injection or priority request, threshold for directly sending TLB prefetches to L2 instead of L1 miss queue, forgiveness threshold, fullness thresholds, number of dedicated L1 TLB prefetch issue queue entries, number of dedicated L2 TLB prefetch issue queue entries, and threshold hits in L2 TLB to stop sending TLB prefetches to L2 TLB.

In implementations, the TLB prefetcher can track (using a L1 TLB hit counter) the number of L1 TLB prefetches and/or L2 TLB prefetches that hit a L1 TLB (which is sent by the TLB as a type of TLB feedback). If the L1 TLB hit counter exceeds a L1 TLB hit threshold, the TLB prefetcher can stop sending L1 TLB prefetches for an applicable trained entry or invalidate the applicable trained entry.

In implementations, the TLB prefetcher can track (a L2 TLB counter) the number of L2 TLB prefetches that hit a L2 TLB established by a TLB demand request (which is sent by the TLB as a type of TLB feedback). If the L2 TLB hit counter exceeds a L2 TLB hit threshold, the TLB prefetcher can stop sending L2 TLB prefetches for the trained entry. Although no L2 miss queues are being used, the stoppage can save bandwidth and power. L1 TLB prefetches for the trained entry are still sent to pull the L2 miss queues into the L1 miss queues when available.

In implementations, the aggressiveness of the TLB prefetcher can be dynamically adjusted based on counting the number of confirmations in the L1 or L2 miss queues which is sent by the respective miss queues as miss queue feedback. Confirmations occur when an miss queue entry is established by a TLB prefetch and later a TLB demand to the same block or PTE is observed or established by a TLB demand and later a TLB prefetch to the same block or PTE is observed. L1 miss queues can be established by L1 TLB prefetches which later have a matching TLB demand or established by TLB demand requests that later have a matching L1 TLB prefetch. An L1 miss queue hit event is created when a respective count has reached a programmable threshold. L2 miss queues can be established by L2 TLB prefetches or by L1 TLB prefetches which later have matching TLB demand requests. An L2 miss queue hit event is created when a count has reached a programmable threshold. When either the L1 miss queue hit event or the L2 miss queue hit event occurs, the aggressiveness (number of TLB prefetches to be sent) of the associated trained entry is increased by one. The process repeats until the aggressiveness reaches a threshold (programmable), beyond which for every such event, the aggressiveness of the respective entry is doubled.

Figure 5:
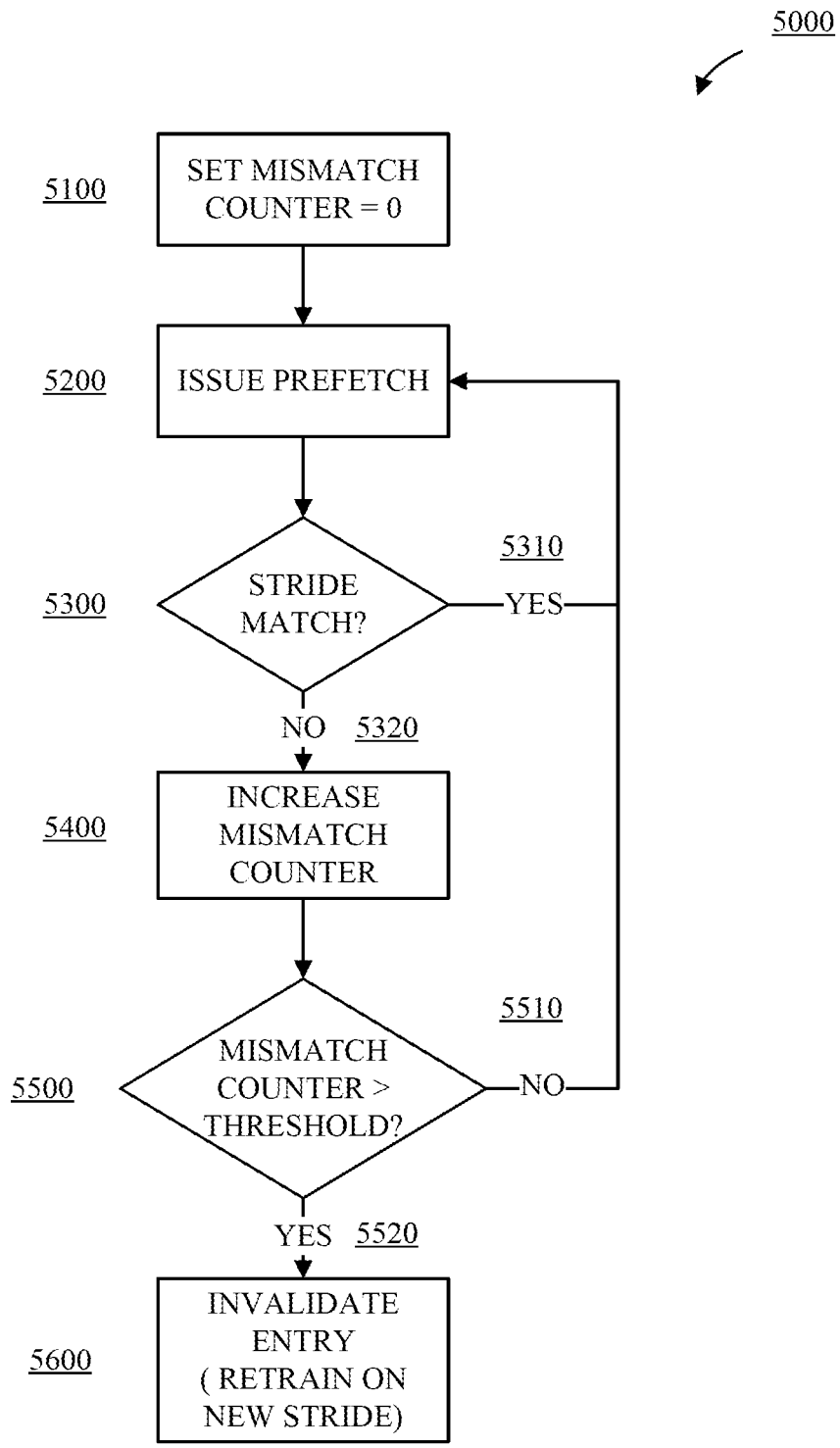
FIG. 5 is a flowchart of an example method for forgiveness for a trained entry in a TLB prefetcher.

FIG. 5 is a flowchart of an example method 5000 for forgiveness for a trained entry in a TLB prefetcher. The method 5000 includes initializing a stride mismatch counter to zero for an entry in a trained state (5100). In implementations, a decrementing counter can be used. The method 5000 includes issuing a TLB prefetch (5200). The method 5000 includes checking a TLB demand request for a mismatch (5300). If the window and stride match (5310), the method 5000 continues issuing TLB prefetches (5200). If the window or stride do not match (5320), the mismatch counter is incremented (or decremented depending on the implementation) (5400). The method 5000 includes checking if a TLB forgiveness threshold has been exceeded (or is less than) (5500). If the mismatch counter has not exceeded (or not fallen below) the TLB forgiveness threshold (5510), then continue issuing TLB prefetches (5200). If the mismatch counter has been exceeded (or has fallen below) the TLB forgiveness threshold (5520), then invalidate the entry (5600). In implementations, retraining can retrain the window, the stride, or both. In implementations, the state machine 3000 of FIG. 3 can go to the detect1 state 3200 to reduce the training time. The TLB forgiveness threshold is a programmable or configurable threshold which can be set, for example, using a configuration status register.

Figure 6:
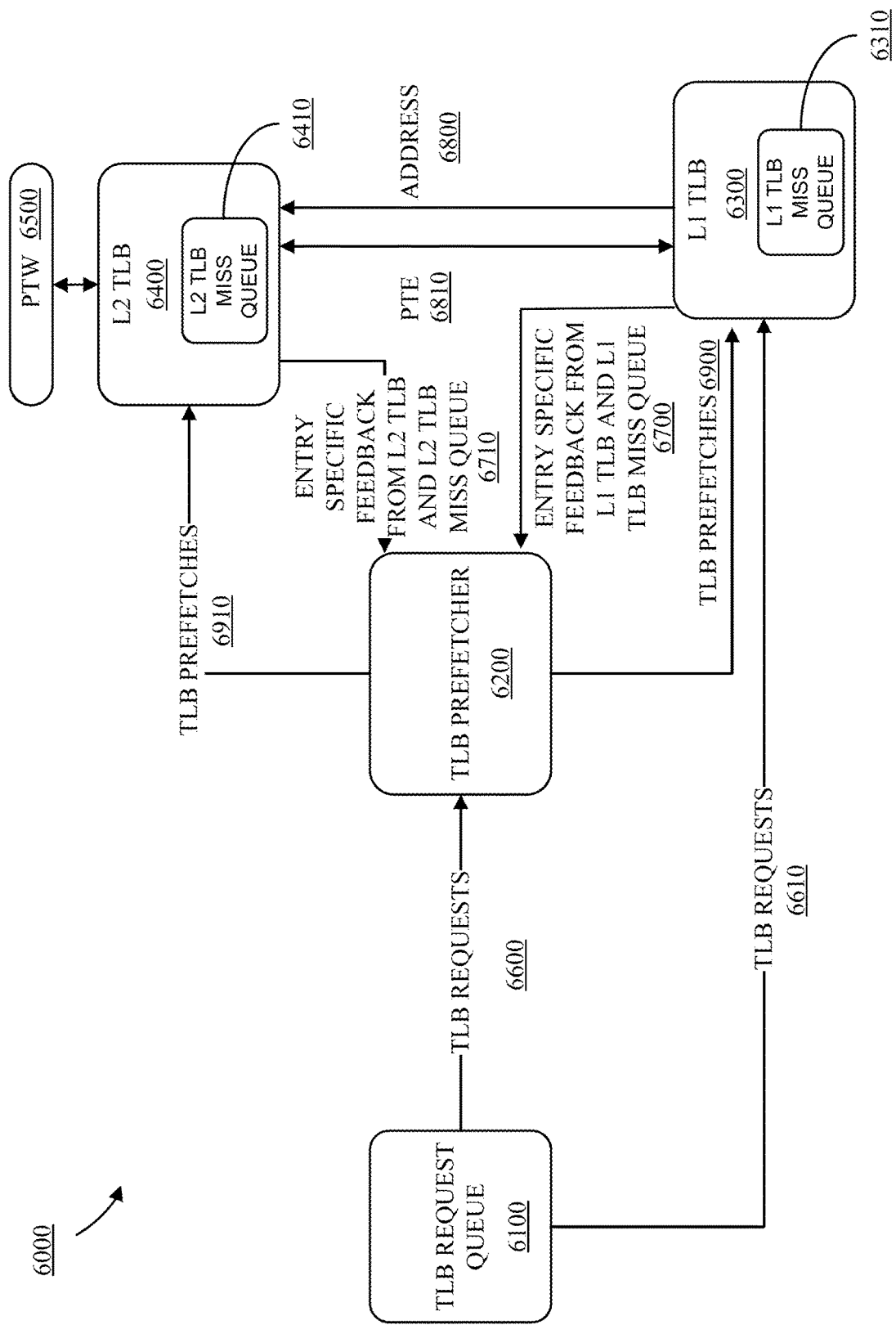
FIG. 6 is a block diagram showing an example of feedback in a TLB prefetcher.

FIG. 6 is a block diagram showing an example of a processing system 6000. The processing system 6000 can be, for example, a core. The processing system 6000 includes a TLB request queue 6100, a TLB prefetcher 6200, an L1 TLB 6300, an L2 TLB 6400, and a PTW 6500. In implementations, the number of TLBs in a TLB hierarchy is variable. Each of the L1 TLB 6300 and the TLB 6400 can include miss queues. For example, the L1 TLB 6300 can include L1 TLB miss queue 6310 and the L2 TLB 6400 can include L2 TLB miss queue 6410. The number of miss queues in each TLB can be different. In implementations, the number of L1 TLB miss queues is typically less than the number of L2 TLB miss queues. Other portions of the processing system 6000 are not shown in FIG. 6 for clarity. The processing system 6000 can implement the methods, the feedback mechanisms, the TLB prefetchers, the miss queues, and the TLBs as described herein.

The TLB request queue 6100 issues or sends a TLB demand request to the TLB prefetcher 6200 (6600) and TLB demand request to the L1 TLB 6300 (6610). The L1 TLB 6300 looks for the requested address by checking if the address is a PTE in the L1 TLB 6300. The L1 TLB 6300 may check its L1 TLB miss queue 6310 to determine whether a miss queue entry has been allocated for the requested address. The L1 TLB miss queue 6310 in the L1 TLB 6300 can track what PTE(s) is being requested from higher levels of TLBs or memory. If a TLB demand request from the TLB request queue 6100 goes directly to the L1 TLB 6300 (i.e., 6610) and sees that a miss queue entry in the L1 TLB miss queue 6310 has been established because of a TLB prefetch from the TLB prefetcher 6200, that means that the TLB prefetcher 6200 has done its job because it has technically hidden the cycles that passed between when the miss queue entry was established and when the TLB demand request 6610 from the TLB request queue 6100 arrived, so the processing system 6000 has saved a number of cycles. The L1 TLB miss queue 6310 can send feedback 6700 to the TLB prefetcher 6200 as positive reinforcement from the L1 TLB miss queue 6310. The feedback 6700 can be a confirmation as described herein. The positive reinforcement can result in increasing the prefetch-distance or increasing the aggressiveness of the TLB prefetcher 6200. The L2 TLB miss queue 6400 operates in a similar manner using the feedback 6710.

If there is a miss queue entry in the L1 TLB miss queue 6310 corresponding to the requested address, this means that there is a pending miss for the requested address in the L1 TLB 6300 and that the PTE for the requested address is not in the L1 TLB 6300. If there is no miss queue entry in the L1 TLB miss queue 6310 corresponding to the requested address, and if a miss queue entry is available in the L1 TLB miss queue 6310, a miss queue entry is allocated for the requested address.

The L1 TLB 6300 then sends requested address (6800) to the L2 TLB 6400. If the requested address 6800 is found in the L2 TLB 6400, the L2 TLB 6400 returns PTE 6810 to the L1 TLB 6300 where the PTE 6810 can be accessed by the TLB request queue 6100. The L2 TLB 6400 looks for the requested address by checking if the address 6800 is a PTE in the L2 TLB 6400. The L2 TLB 6400 may check the L2 miss queues 6410 to determine whether a miss queue entry has been allocated for the requested address. If there is a miss queue entry in the L2 miss queue 6410 corresponding to the requested address, this means that there is a pending miss for the requested address in the L2 TLB 6400 and that the PTE is not in the L2 TLB 6400. If there is no miss queue entry in the L2 TLB 6400 corresponding to the requested address 6800, and if a miss queue entry is available in the L2 miss queues 6410, a miss queue entry is allocated for the requested address 6800. The L2 TLB 6400 then sends the requested address to the PTW 6500. The PTW 6500 performs a page table walk to find the requested address and returns a PTE to the L2 TLB 6400, where the PTE can be accessed by the TLB request queue 6100 as described herein.

The TLB prefetcher 6200 uses the TLB demand request 6600 received from the TLB request queue 6100 to train itself on an access pattern based on multiple TLB demand requests from the same access or demand stream resulting in a trained entry. When there is an idle cycle available, the prefetcher 6200 sends TLB prefetches to different TLB levels based on the determined patterns for the individual access or demand streams or trained entries. In an implementation, the prefetcher 6200 includes an arbiter to select a TLB prefetch from each of the streams in a round-robin manner.

The prefetcher 6200 sends an access or demand prefetch 6900 to the L1 TLB 6300. If the L1 TLB 6300 has the PTE requested by the TLB prefetch 6900, then the TLB prefetch 6900 was not useful. The PTE is in the L1 TLB 6300 because another request already requested the PTE. So the prefetch 6900 sent by the TLB prefetcher 6200 is not useful, and any TLB prefetcher pattern that has been latched onto should be disincentivized. The L1 TLB 6300 can send feedback 6700 to the TLB prefetcher 6200 to indicate that the TLB prefetch 6900 was not useful or as negative reinforcement, where negative reinforcement can result in moving towards invalidation or invalidation of the entry. For example, a L1 TLB hit counter can be increased. This moves the L1 TLB hit counter toward the L1 TLB hit threshold, where reaching the L1 TLB hit threshold would mean stop sending L1 TLB prefetches.

If the L1 TLB 6300 does not have the PTE requested by the TLB prefetch 6900, then the PTE is retrieved from higher levels of TLB or from memory via the PTW 6500 as described herein. In this instance, the TLB prefetch 6900 is useful and the L1 TLB 6300 can send feedback 6700 to the TLB prefetcher 6200 as positive reinforcement. In this instance, the feedback 6700 is used by the TLB prefetcher 6200 to increase the number of TLB prefetches sent from that entry, and the TLB prefetcher 6200 has latched onto a good pattern. A goal is to incentivize this pattern, since the PTE is not in the L1 TLB 6300 (i.e., that the TLB prefetch from the TLB prefetcher 6200 was accurate and considered to be a "good" TLB prefetch). For example, a L1 TLB hit counter can be decreased. This moves the L1 TLB hit counter further away from reaching a L1 TLB hit threshold, where reaching the L1 TLB hit threshold would mean stop sending L1 TLB prefetches.

The TLB prefetcher 6200 sends a TLB prefetch 6910 to the L2 TLB 6400. If the L2 TLB 6400 has the PTE requested by the TLB prefetch 6910, then the TLB prefetch 6910 was not useful. The PTE is in the L2 TLB 6400 because another TLB demand request already requested the PTE. So the prefetch 6910 sent by the TLB prefetcher 6200 is not useful, and any TLB prefetcher pattern that has been latched onto should be disincentivized. The L2 TLB 6400 can send feedback 6710 to the TLB prefetcher 6200 to indicate that the TLB prefetch 6910 was not useful or as negative reinforcement. For example, a L2 TLB hit counter can be increased. This moves the L2 TLB hit counter toward the L2 TLB hit threshold, where reaching the L2 TLB hit threshold would mean stop sending L2 TLB prefetches.

If the L2 TLB 6400 does not have the PTE requested by the TLB prefetch 6910, then the PTE is retrieved from higher levels of TLB or from memory via the PTW 6500 as described herein. In this instance, the TLB prefetch 6910 is useful and the L2 TLB 6400 can send feedback 6710 to the TLB prefetcher 6200 as positive reinforcement. In this instance, the feedback 6710 is used by the TLB prefetcher 6200 to increase the number of TLB prefetches sent from that entry, and the TLB prefetcher 6200 has latched onto a good pattern. A goal is to incentivize this pattern since the PTE is not in the L2 TLB 6400. For example, a L2 TLB hit counter can be decreased. This moves the L2 TLB hit counter further away from reaching a L2 TLB hit threshold, where reaching the L2 TLB hit threshold would mean stop sending L2 TLB prefetches. In this instance, the PTW 6500 performs a page table walk to find the requested address and returns a PTE to the L2 TLB 6400, where the PTE can be accessed by the TLB request queue 6100 as described herein.

Figure 7:
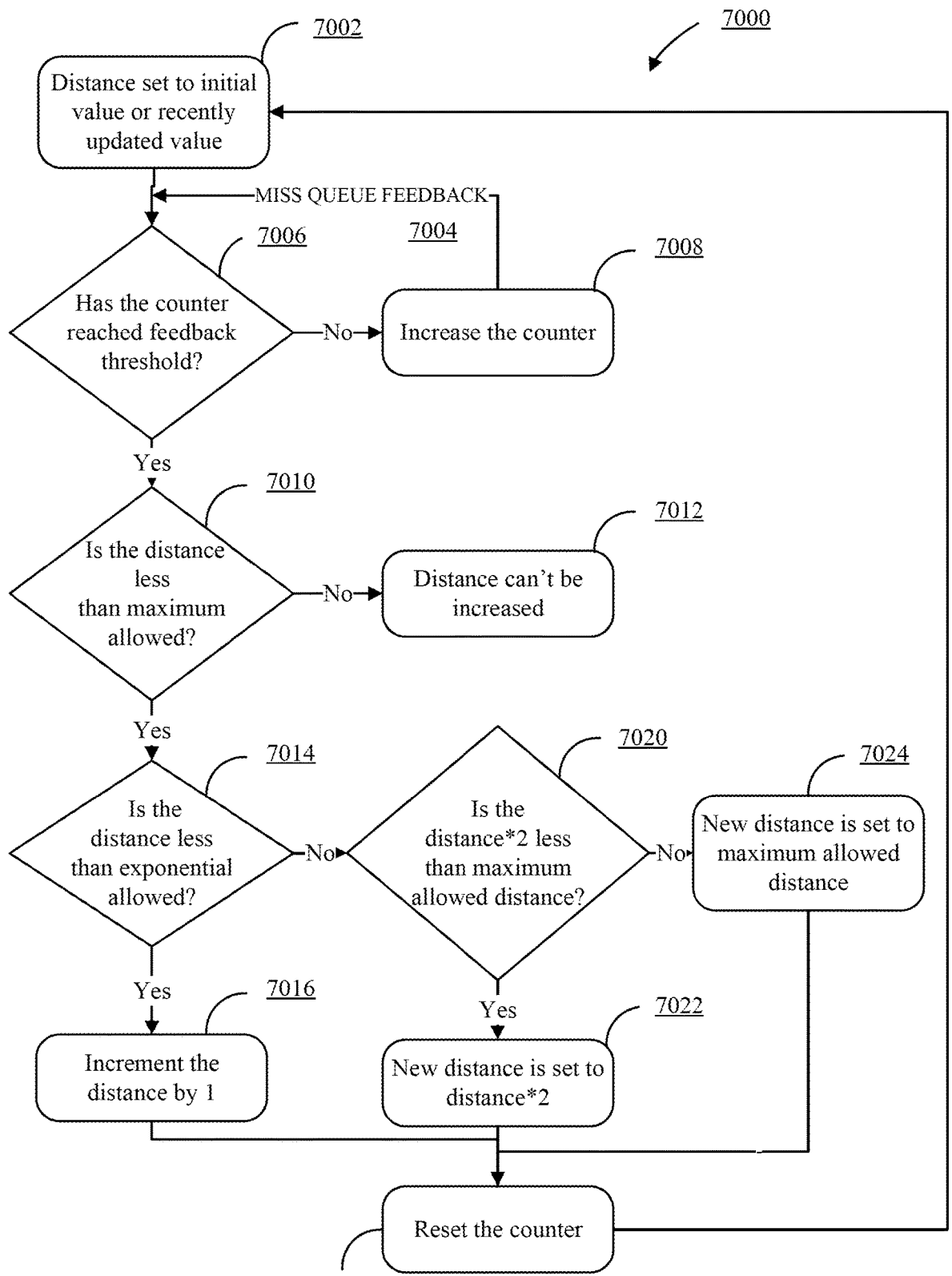
FIG. 7 is a flowchart of an example method for tuning the aggressiveness of a TLB prefetcher.

FIG. 7 is a flowchart of a method 7000 for tuning the aggressiveness of a TLB prefetcher. The method 400 may be implemented by the TLB prefetcher 1100 shown in FIG. 2 and/or the TLB prefetcher 6200 shown in FIG. 6.

The prefetching distance (i.e., the number of TLB prefetches sent by a TLB prefetcher) is set to an initial value or to a recently updated value (operation 7002). The prefetching distance is per access stream. The TLB prefetcher receives feedback from the TLB about the status of its respective miss queues (operation 7004). It is noted that the TLB prefetcher may receive feedback from different levels of the TLB hierarchy. The feedback and the prefetching distance are specific to a particular TLB level, e.g., L1 or L2. Based on the feedback, the TLB prefetcher updates a TLB feedback counter. The TLB feedback counter is used to count the number of "good" TLB prefetches sent by the TLB prefetcher.

A determination is made whether the TLB feedback counter has reached a TLB feedback threshold (operation 7006). The TLB feedback threshold is used to determine the number of "good" TLB prefetches that are sent by the TLB prefetcher before increasing the TLB prefetcher's aggressiveness. In an implementation, the TLB feedback threshold may be stored in a register. If the TLB feedback counter has not reached the TLB feedback threshold (operation 7006, "no" branch), then the TLB feedback counter is increased (operation 7008). The feedback received from the TLB is counted as additional reinforcement that the TLB prefetches are "good" TLB prefetches. The method 7000 continues with the TLB prefetcher receiving the feedback (operation 7004).

If the TLB feedback counter has reached the TLB feedback threshold (operation 7006, "yes" branch), then a determination is made whether the prefetch-distance is less than the maximum allowed prefetch-distance (operation 7010). If the prefetch-distance is not less than the maximum allowed prefetch-distance (operation 7010, "no" branch), then this means that the prefetch-distance is at the maximum allowed prefetch-distance and cannot be further increased (operation 7012).

If the prefetch-distance is less than the maximum allowed prefetch-distance (operation 7010, "yes" branch), then a determination is made whether the prefetch-distance is less than the exponential threshold (operation 7014). The exponential threshold is a value at which the prefetch-distance increase is changed from a linear increase (e.g., +1) to an exponential increase (e.g., ×2). If the prefetch-distance is less than the exponential threshold (operation 7014, "yes" branch), then the prefetch-distance is increased by one (operation 7016), the TLB feedback counter is reset (operation 7018), and the method 7000 continues with the recently updated prefetch-distance value (operation 7002). The TLB feedback counter is reset to zero (operation 7018) when the prefetch-distance is changed (i.e., after the aggressiveness of the TLB prefetcher increases). In an implementation, the TLB feedback counter may range from 0 to (16/threshold). Once the TLB feedback counter reaches the threshold, the aggressiveness is increased and the TLB feedback counter is reset to zero. If the TLB feedback counter is not reset to zero each time the aggressiveness increases, the aggressiveness would increase too quickly, and such an implementation would require more hardware and is not efficient.

If the prefetch-distance is equal to or greater than the exponential threshold (operation 7014, "no" branch), then a determination is made whether doubling the current prefetch-distance is less than the maximum allowed prefetch-distance (operation 7020). If doubling the current prefetch-distance is less than the maximum allowed prefetch-distance (operation 7020, "yes" branch), then the prefetch-distance is doubled (operation 7022), the TLB feedback counter is reset (operation 7018), and the method 7000 continues with the recently updated prefetch-distance value (operation 7002).

If doubling the current prefetch-distance would be greater than the maximum allowed prefetch-distance (operation 7020, "no" branch), then the prefetch-distance is set to the maximum allowed prefetch-distance (operation 7024), the TLB feedback counter is reset (operation 7018), and the method 7000 continues with the recently updated prefetch-distance value (operation 7002).

There are limits on how much the TLB prefetcher's aggressiveness can increase. The first limit is the threshold for switching from linear increases to exponential increases (i.e., the exponential threshold). The second limit is the maximum allowed distance, which is the top threshold beyond which TLB prefetcher aggressiveness cannot be increased. That is, a two-tiered approach is employed to check aggressiveness.

There is also a mechanism for feedback that is negative, e.g., if the TLB prefetches are late. A TLB prefetch is not useful if another request already went to the TLB and established a miss queue entry. In such an instance, the TLB prefetcher aggressiveness would be decreased. Alternatively, the stride of the TLB prefetcher can be broken and the TLB prefetcher may be trained on a new stride.

After a certain number of negative responses are received (e.g., an invalidation threshold), the TLB prefetcher may invalidate the engine, which means that the stride pattern of the TLB prefetcher is broken and can retrain on a new pattern or is assigned a new pattern.

If a TLB prefetcher entry is trained and locked onto a certain stream and if the number of non-matching TLB demands received by the TLB prefetcher exceed a programmable threshold set for a TLB prefetcher entry, then the entry can be aged-out out to make a space for a new stream.

In an implementation, the TLB prefetcher, TLB prefetches, and the TLB counters may work in a similar way for both the L1 TLB and the L2 TLB together. In such an implementation, the feedback from both the L1 TLB and the L2 TLB is combined. There are different hit counters for the L1 TLB and the L2 TLB, and different thresholds for each TLB level. Each TLB level's response is checked against its respective feedback threshold. Once the TLB feedback counter is below the TLB feedback threshold, it is interpreted as legitimate feedback for that TLB level. All the responses are combined, to determine a unified "term" for response. This unified "term" is used to increase the overall aggressiveness of the TLB prefetcher.

Miss queue feedback looks at whether TLB prefetches are hitting in any established miss queue entries and whether TLB demands from the core are hitting in any established miss queue entries. For example, feedback from the L1 TLB miss queue may include the feedback shown in Table 1.

TABLE 1

L1 TLB Miss Queue feedback impact

| L1 TLB Miss Queue Feedback | Impact |
|---|---|
| If TLB demand requests match L1 TLB Prefetches in progress | Increase aggressiveness |
| If L1 TLB prefetches match TLB Demands in progress | Increase aggressiveness |
| How many L1 TLB miss queue entries are used | If the number of used L1 TLB miss queue entries exceeds the threshold, stop sending TLB prefetches. Threshold (programmable) is a maximum number of occupied L1 TLB miss queue entries (either by TLB prefetches or TLB demands). |

If the TLB demand requests from the core are hitting in an L1 TLB miss queue entry established by a prior L1 TLB prefetch, the aggressiveness of the TLB prefetcher is increased as described above. If the TLB demand requests from the core are hitting in an L1 TLB miss queue, this means that the prior L1 TLB prefetches were prefetching in the right direction (e.g., positive reinforcement). Similarly, if an L1 TLB prefetch matches a TLB demand request that is still in progress (e.g., positive reinforcement), the aggressiveness of the TLB prefetcher is increased as described above. If an L1 TLB prefetch matches a TLB demand request, this is a self-validating indication that the L1 TLB prefetches are going in the right direction (e.g., positive reinforcement). If a number of used L1 TLB miss queue entries exceeds a predetermined threshold (which may be set via a register), then the TLB prefetcher will stop sending TLB prefetches. When the TLB prefetcher stops sending TLB prefetches, it may retain the previously used stride value such that the TLB prefetcher can be restarted at a later point in time without having to be retrained. Stopping the TLB prefetcher in this manner is different from invalidating the TLB prefetch stream, in which the TLB prefetcher is re-trained on a new stream looking for a new stride value.

TABLE 2

L2 TLB Miss Queue feedback impact

| L2 TLB Miss Queue Feedback | Impact |
|---|---|
| If TLB demand requests match L2 TLB prefetches in progress | Increase aggressiveness |
| If L1 TLB prefetches match L2 TLB prefetches in progress | Increase aggressiveness |
| If L2 TLB prefetches match TLB demands in progress | Increase aggressiveness |
| If L2 TLB prefetches match L1 TLB prefetches in progress | Increase aggressiveness |
| How many L2 miss queue entries are used | If the number of used L2 TLB miss queue entries exceeds the threshold, stop sending TLB prefetches. Threshold (programmable) is a maximum number of occupied L2 TLB miss queue entries (either by TLB prefetches or TLB demands). |

The L2 TLB miss queue feedback impact shown in Table 2 functions similarly to the L1 TLB miss queue feedback, with several possibilities for increasing the TLB prefetcher aggressiveness. As shown in Table 2, the TLB prefetcher aggressiveness is increased if any one of the following conditions are true: (1) if TLB demand requests match L2 TLB prefetches in progress, (2) if L1 TLB prefetches match L2 TLB prefetches in progress, (3) if L2 TLB prefetches match TLB demands in progress, or (4) if L2 TLB prefetches match L1 TLB prefetches in progress (e.g., positive reinforcement). If a number of used L2 TLB miss queue entries exceeds a predetermined threshold (which may be set via a register), then the TLB prefetcher will stop sending TLB prefetches. It is noted that the number of L1 TLB miss queue may be the same as or different from the number of L2 TLB miss queues. In an implementation, because the L2 TLB is generally larger than the L1 TLB, the number of L2 miss queue entries can be greater than the number of L1 miss queue entries. Similarly, the thresholds used by the L1 TLB and the L2 TLB to determine when to stop sending TLB prefetches based on the number of available miss queue entries may vary. In an implementation, a small number of miss queue entries (e.g., one or two) may be reserved such that there are always miss queue entries available.

Before a TLB prefetch establishes a miss queue entry (in any TLB level), the load-store unit checks if the address of the TLB prefetch is already in the TLB. If a PTE matches for the prefetch address, this means that the address sought by the TLB prefetch is already in the TLB. Similar to miss queue feedback, the TLB may also send feedback based on whether there is a hit or a miss in the TLB lookup. In order to keep the L1 TLB checking logic and the associated data pipe less occupied with TLB prefetches (and allow faster flow of TLB demands), the checks for L2 TLB prefetches can be skipped to boost the overall core performance.

TABLE 3

Impact of L1 TLB feedback

| L1 TLB feedback | Impact |
|---|---|
| L1 or L2 TLB prefetches hitting L1 TLB | Once the programmable threshold is reached, invalidate the entry |

If L1 or L2 TLB prefetches hit in the L1 TLB (meaning that the address is present in the L1 TLB), this means that the TLB prefetches are not useful because there is no need to bring the PTE back from higher levels in the TLB hierarchy if the PTE is already in the L1 TLB (which is what the TLB prefetches do) (e.g., negative reinforcement). A TLB hit counter may be used to determine when to invalidate a TLB prefetch stream, entry, or engine. For example, if TLB prefetches hit in the TLB more than N times (e.g., five times), then invalidate the stream and then retrain the TLB prefetcher on a new stream. If L1 or L2 TLB prefetches are missing in the L1 TLB, then a L1 TLB hit counter is decreased.

TABLE 4

Impact of L2 TLB feedback

| L2 TLB feedback | Impact |
|---|---|
| L2 TLB prefetches hitting L2 TLB | Stop the L2 TLB prefetches |
| L1 TLB prefetches missing L2 TLB | Start the L2 TLB prefetches |
| TLB demands missing L2 TLB | Start the L2 TLB prefetches |

The L2 TLB feedback operates in a similar way as the L1 TLB feedback. In the L2 MB, check if the L2 TLB prefetches are hitting the L2 TLB, and if so, stop the L2 TLB prefetches. If the L1 TLB prefetches are missing in the L2 TLB, start the L2 TLB prefetches. Also, if TLB demand requests from the core are missing in the L2 TLB, start the L2 TLB prefetches. In the latter two instances, the TLB prefetcher can be restarted using the previously trained stream if the TLB hit counter is below the invalidate threshold.

Figure 8:
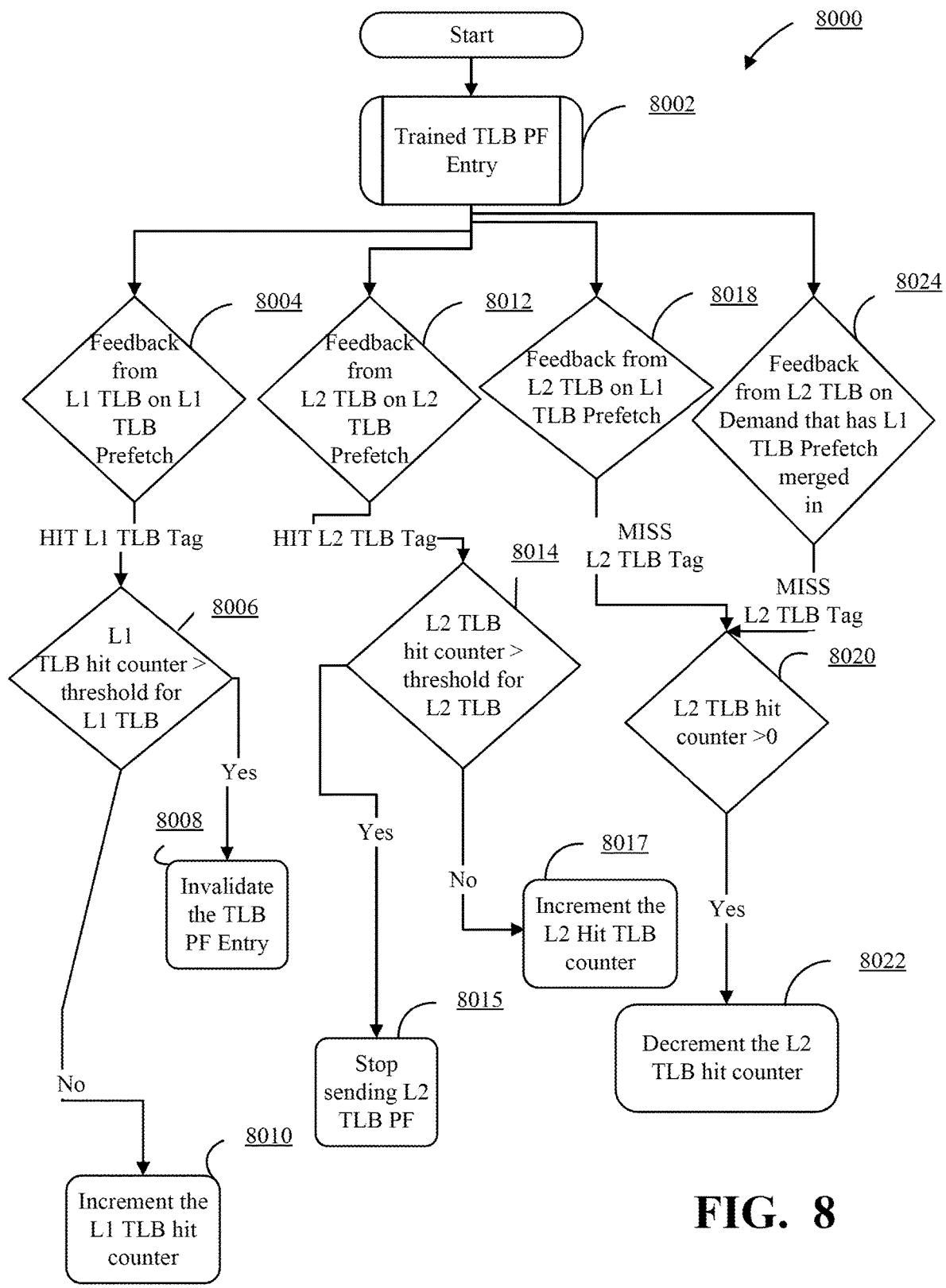
FIG. 8 is a flowchart of an example method for feedback when a TLB prefetcher is in a trained state.

FIG. 8 is a flowchart of a method 8000 for feedback when a TLB prefetcher is in a trained state. After the TLB prefetcher is in a trained state, it sends out TLB prefetches based on the training for each entry (operation 8002). The TLB prefetcher receives feedback based on the sent TLB prefetch and based on TLB demand requests issued by the core. The source of the feedback varies based on where the TLB prefetch or the TLB demand request was sent. For example, the TLB prefetch or TLB demand request may be sent to the L1 TLB or the L2 TLB. It is noted that for purposes of discussion, only feedback from the L1 TLB or the L2 TLB is described. The method 500 performs in a similar manner if other TLB levels are used.

If the feedback is L1 TLB prefetch feedback from the L1 TLB and the feedback indicates that the TLB prefetch hits in the L1 TLB tag (operation 8004), then a determination is made whether the L1 TLB hit counter is greater than the threshold for the L1 TLB (operation 8006). If the L1 TLB hit counter is greater than the threshold for the L1 TLB (operation 8006, "yes" branch), then the TLB prefetch stream is invalidated (operation 8008). If the L1 TLB prefetch hits the L1 TLB tag, this means that the address requested by the TLB prefetch already exists in the L1 TLB, so the TLB prefetch is not useful. After a threshold number of hits in the L1 TLB, the stride value or TLB prefetch stream is invalidated. If the L1 TLB hit counter is less than the threshold for the L1 TLB (operation 8006, "no" branch), then the L1 TLB hit counter is incremented (operation 8010).

If the feedback is L2 TLB prefetch feedback from the L2 TLB and the feedback indicates that the TLB prefetch hits in the L2 TLB tag (operation 8012), then a determination is made whether the L2 TLB hit counter is greater than the threshold for the L2 TLB (operation 8014). It is noted that the threshold for the L2 TLB may be different than the threshold for the L1 TLB and may be stored separately, e.g., in separate registers. If the L2 TLB hit counter is greater than the threshold for the L2 TLB (operation 8014, "yes" branch), then the TLB prefetcher will stop sending L2 TLB prefetches (operation 8015). If the L2 TLB prefetch hits in the L2 TLB tag, this means that the address requested by the TLB prefetch already exists in the L2 TLB, so the TLB prefetch is not useful. After a threshold number of hits in the L2 TLB, no further L2 TLB prefetches should be sent. If the L2 TLB hit counter is less than the threshold for the L2 TLB (operation 8014, "no" branch), then the L2 TLB hit counter is incremented (operation 8017).

If the feedback is L1 TLB prefetch feedback from the L2 TLB and the feedback indicates that the TLB prefetch misses in the L2 TLB tag (operation 8018), then a determination is made whether the L2 TLB hit counter is greater than zero (operation 8020). If the L2 TLB hit counter is greater than zero (operation 8020, "yes" branch), then the L2 TLB hit counter is decremented (operation 8022). If the L1 TLB prefetch misses in the L2 TLB tag, this means that the address requested by the TLB prefetch does not exist in the L2 TLB, so the TLB prefetch is useful and the L2 TLB hit counter may be decremented. If the L2 TLB hit counter is greater than zero (operation 8020, "no" branch), then no action is taken.

If the feedback from the L2 TLB is for a demand that has a L1 TLB prefetch merged in, and if the feedback indicates a miss in the L2 TLB tag (operation 8024), then the feedback provides a positive reinforcement and a determination is made whether the L2 TLB hit counter is greater than zero (operation 8020). If the L2 TLB hit counter is greater than zero (operation 8020, "yes" branch), then the L2 TLB hit counter is decremented (operation 8022). If the L2 TLB hit counter was at the threshold level (before decrementing), upon decrementing the L2 TLB hit counter, the TLB prefetcher can start sending the TLB prefetches. That is, the address requested by the TLB demand does not exist in the L2 TLB, and will be retrieved from a higher TLB level or from memory. If the L2 TLB hit counter is zero (operation 8020, "no" branch), then no action is taken. The TLB prefetcher will continue sending TLB prefetch requests as before.

In implementations, if the feedback is 1) L1 TLB prefetch feedback from the L1 TLB and the feedback indicates that the L1 TLB prefetch misses in the L1 TLB tag, 2) L2 TLB prefetch feedback from the L1 TLB and the feedback indicates that the L2 TLB prefetch misses in the L1 TLB tag, 3) L1 TLB prefetch feedback from the L2 TLB and the feedback indicates that the L1 TLB prefetch misses in the L2 TLB tag, or 4) feedback from the L2 TLB is for a TLB demand that has L1 TLB prefetch merged in, then the TLB prefetcher may decrease TLB hit counter values as appropriate. For example, if the current value of a L1 TLB hit feedback counter is 7 and the current value of the TLB hit cache threshold is 8, the L1 TLB hit feedback counter may be decremented from 7 to 6. The TLB feedback threshold is not adjusted (i.e., in this example, the TLB feedback threshold would remain at 8).

In implementations, if the feedback is 1) L1 TLB prefetch feedback from the L1 TLB and the feedback indicates that the L1 TLB prefetch hits in the L1 TLB tag, 2) L2 TLB prefetch feedback from the L1 TLB and the feedback indicates that the L2 TLB prefetch hits in the L1 TLB tag, or 3) L2 TLB prefetch feedback from the L2 TLB and the feedback indicates that the L2 TLB prefetch hits in the L2 TLB tag, then the TLB prefetcher can increment a TLB hit counter for the TLB prefetcher engine which sent the TLB prefetch request. For example, if a TLB prefetch misses a L2 TLB tag, increment the L2 TLB hit counter for the engine that sent the request.

In implementations, if a TLB hit counter threshold has been reached, then the TLB prefetcher can 1) invalidate the TLB prefetcher engine and re-train it on a new pattern, or 2) stop sending TLB prefetches or TLB prefetch requests. After a predetermined number of such responses (which may be programmable via a register) have been received from one TLB engine locked on one pattern, that TLB engine is invalidated and can attempt to lock onto a new pattern.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a pipeline of processing steps may be utilized to process the circuit representation into one or more intermediate circuit representations followed by a final circuit representation which is then used to program or manufacture an integrated circuit. For example, a circuit representation in the form of a Chisel program may be stored on a non-transitory computer readable medium and may be processed by a computer to produce a FIRRTL intermediate circuit representation. The FIRRTL intermediate circuit representation may then be processed by a computer to produce a Verilog HDL (VHDL) intermediate circuit representation. The VHDL intermediate representation may then be processed by a computer to produce a netlist that is used to produce the integrated circuit. The foregoing steps may be executed by the same computer, different computers, or some combination thereof, depending on the implementation.

Described herein are implementations with respect to a TLB prefetcher with multi-level prefetches and feedback architecture. The implementations may include methods and processors, integrated circuits, and components therein to perform the methods.

In implementations, a processing system includes two or more translation lookaside buffer (TLB) levels, each TLB level including a miss queue; and a TLB prefetcher connected to each of the two or more TLB levels, the TLB prefetcher configured to receive feedback from the miss queue at each TLB level for previously sent TLB prefetches; and control number of TLB prefetches sent for a trained TLB entry to each TLB level of the two or more TLB levels based on the feedback.

In implementations, the feedback includes a fullness indicator of the miss queue at each TLB level, the TLB prefetcher configured to send TLB prefetches to TLB levels of the two or more TLB levels which have available miss queue entries. In implementations, the fullness indicator is a relative indicator allowing the TLB prefetcher to be uninformed of an absolute size of the miss queue at each TLB level. In implementations, the feedback includes a confirmation for the trained entry, the confirmation indicating that a TLB demand address matches a pending TLB prefetch address, the TLB prefetcher configured to send a TLB prefetch for the trained entry to a first TLB level of the two or more TLB levels and send another TLB prefetch for the trained entry to at least a second TLB level of the two or more TLB levels. In implementations, the feedback includes a confirmation for the trained entry, the confirmation indicating that the trained entry is prefetching in a proper direction, the prefetcher configured to send a TLB prefetch for the trained entry to a first TLB level of the two or more TLB levels and send another TLB prefetch for the trained entry to at least a second TLB level of the two or more TLB levels. In implementations, the processing system further including a TLB prefetch issue queue, the TLB prefetch issue queue enabling the TLB prefetcher to replay a TLB prefetch if miss queue entries are exhausted, miss in a page table cache, miss in view of a resource check, or miss in view of a hazard check prior to completion of sending the TLB prefetch. In implementations, the TLB prefetcher can replay the TLB prefetch by converting on-the-fly the TLB prefetch from one TLB level to another TLB level. In implementations, the TLB prefetcher can replay the TLB prefetch by replaying the TLB prefetch from the prefetch issue queue. In implementations, the prefetch issue queue includes dedicated prefetch slots for each cache level. In implementations, the TLB prefetcher includes a state machine configured to establish trained entries in the TLB prefetcher, each entry having a base address and a stride; and a forgiveness counter to track number of stride mismatches resulting from TLB demand requests, where the state machine is configured to control moving from a trained state to a non-trained state for a trained entry when the forgiveness counter exceeds a stride mismatch threshold. In implementations, the TLB prefetcher includes a TLB hit counter for each TLB level, each TLB hit counter tracks number of TLB prefetches sent for a trained entry that hit a TLB established by a TLB demand request, where the TLB prefetcher is configured to stop sending TLB prefetches for the trained entry when the TLB hit counter exceeds a TLB hit threshold for the associated TLB level. In implementations, the TLB prefetcher includes a TLB hit counter for each TLB level, each TLB hit counter tracks number of TLB prefetches sent for a trained entry that hit a TLB established by a demand request, where the TLB prefetcher is configured to invalidate the trained entry for an associated TLB level when the TLB hit counter exceeds a TLB hit threshold for the associated TLB level. In implementations, the TLB prefetcher includes a first level TLB miss queue confirmation or hit-counter for a first level TLB, the first level TLB miss queue confirmation or hit-counter counts number of TLB demand requests for a trained entry that hit a miss queue entry established by first level TLB prefetches or counts number of first level TLB prefetch requests for a trained entry that hit a miss queue entry established by a TLB demand, wherein a first level TLB miss queue hit event is generated when the first level TLB miss queue confirmation or hit-counter exceeds a first level TLB miss queue hit threshold; and a higher level TLB miss queue hit-counter for each higher level TLB, each higher level TLB miss queue hit-counter counts number of hits by the first level TLB prefetches that hit a higher level TLB miss queue entry established by higher level TLB prefetches that hit an entry established by lower level TLB prefetches, wherein a higher level TLB miss queue hit event is generated when the higher level TLB miss queue hit-counter exceeds a higher level TLB miss queue hit threshold, where an aggressiveness of the TLB prefetcher is increased upon occurrence of either the first level TLB miss queue hit event or the higher level TLB miss queue hit event.

In implementations, a method for sending translation lookaside buffer (TLB) prefetches includes receiving, by a TLB prefetcher from miss queues at each TLB level of a multi-level TLB hierarchy, feedback for previously sent TLB prefetches; and controlling, by the TLB prefetcher, number of TLB prefetches sent for a trained entry to two or more TLB levels in the multi-level TLB hierarchy based on the feedback.

In implementations, the feedback includes a fullness indicator of the miss queues at each TLB level, and wherein the fullness indicator is a relative indicator allowing the TLB prefetcher to be uninformed of an absolute size of the miss queue at each TLB level, the sending further including sending TLB prefetches to TLB levels of the multi-level TLB hierarchy which have available miss queue entries. In implementations, the feedback includes a confirmation for the trained entry, the confirmation indicating that a TLB demand address matches a pending TLB prefetch address, the method further including sending a TLB prefetch for the trained entry to a first level TLB of the multi-level TLB hierarchy; and sending another TLB prefetch for the trained entry to at least a second TLB level of the multi-level TLB hierarchy. In implementations, the method further includes establishing, by a state machine in the TLB prefetcher, trained entries, each entry having a base address and a stride, counting, by a forgiveness counter in the TLB prefetcher, number of stride mismatches resulting from TLB demand requests for a trained entry, and moving from a trained state to a non-trained state for the trained entry when the forgiveness counter exceeds a stride mismatch threshold.

In implementations, a translation lookaside buffer (TLB) prefetcher includes one or more trained entries for each TLB in at least a two-level TLB hierarchy, the TLB prefetcher configured to receive feedback, from miss queues at each TLB of the at least two-level TLB hierarchy, for previously sent TLB prefetches and control sending, to two or more TLB in the at least two-level TLB hierarchy, TLB prefetches for a trained entry based on the feedback.

In implementations, the feedback includes a fullness indicator of the miss queue at each TLB level, and wherein the fullness indicator is a relative indicator allowing the TLB prefetcher to be uninformed of an absolute size of the miss queue at each TLB level of the at least a two-level TLB hierarchy, the TLB prefetcher further configured to send TLB prefetches to TLB levels of the at least a two-level TLB hierarchy which have available miss queue entries. In implementations, the feedback includes a confirmation for the trained entry, the confirmation indicating that a TLB demand address matches a pending TLB prefetch address, the TLB prefetcher further configured to send a TLB prefetch for the trained entry to a first TLB level of the at least a two-level TLB hierarchy and send another TLB prefetch for the trained entry to at least a second TLB level of at least a two-level TLB hierarchy.

In implementations, a processing system includes two or more translation lookaside buffer (TLB) levels, each TLB level including a miss queue; and a TLB prefetcher connected to each of the two or more TLB levels, the TLB prefetcher configured to send a number of TLB prefetches to at least one TLB level of the two or more TLB levels, receive feedback from miss queues as to whether sent TLB prefetches and TLB demand requests match established miss queue entries, and feedback from the TLB level as to whether the sent TLB prefetches and the TLB demand requests match TLB tags, and perform at least one of change a prefetch-distance of a TLB entry based on the received feedback, invalidate the TLB entry based on the received feedback, or stop sending TLB prefetches to one or more TLB levels of the two or more TLB levels based on the received feedback.

In implementations, to change the prefetch-distance the TLB prefetcher is configured to linearly increase the prefetch-distance when a counter has reached a threshold due to the received feedback being positive reinforcement with respect to sent TLB prefetches. In implementations, to change the prefetch-distance the TLB prefetcher is configured to exponentially increase the prefetch-distance when a counter has reached a threshold due to the received feedback being positive reinforcement with respect to sent TLB prefetches. In implementations, the TLB prefetcher configured to determine whether a counter has reached a threshold due to the received feedback being positive reinforcement with respect to sent TLB prefetches, determine whether the prefetch-distance is less than a maximum allowed threshold when the counter reaches the threshold, determine whether the prefetch-distance is less than an exponential threshold when the prefetch-distance is below a maximum allowed prefetch-distance, linearly increase the prefetch-distance when the prefetch-distance is less than the exponential threshold; determine whether twice the prefetch-distance is less than the maximum allowed prefetch-distance when the prefetch-distance reaches the exponential threshold, set the prefetch-distance to twice the prefetch-distance when the prefetch-distance is less than the maximum allowed prefetch-distance, set the prefetch-distance to the maximum allowed prefetch-distance when the twice the prefetch-distance at least reaches the maximum allowed prefetch-distance, and reset the counter. In implementations, the TLB prefetcher configured to increase the counter when a count is less than the threshold and forego increasing the prefetch-distance when the maximum allowed prefetch-distance has been reached. In implementations, to change the prefetch-distance the TLB prefetcher is configured to increase the prefetch-distance when the received feedback from the miss queues is positive reinforcement with respect to sent TLB prefetches. In implementations, to invalidate the TLB entry the TLB prefetcher is configured to invalidate the TLB entry when the received feedback is negative reinforcement with respect to sent TLB prefetches. In implementations, to stop sending TLB prefetches the TLB prefetcher is configured to stop sending TLB prefetches to the one or more TLB levels when the received feedback is negative reinforcement with respect to sent TLB prefetches. In implementations, to invalidate the TLB entry the TLB prefetcher is configured to track using the received feedback whether a sent TLB prefetch is a hit or a miss in a TLB tag lookup and invalidate the TLB entry when a counter for the received feedback is greater than a threshold number of hits. In implementations, the TLB prefetcher further configured to age-out a trained TLB entry for a new stream when a number of non-matching TLB demand requests received by the TLB prefetcher exceed a programmable threshold set for the trained TLB entry.

In implementations, a method for translation lookaside buffer (TLB) prefetcher feedback includes sending, for a TLB entry by a TLB prefetcher to one or more TLBs in a TLB hierarchy, a number of TLB prefetches, wherein each TLB has a miss queue, receiving, by the TLB prefetcher, feedback from each of miss queue as to whether sent TLB prefetches and TLB demand requests match established miss queue entries, and feedback from the TLB as to whether the sent TLB prefetches and the TLB demand requests match TLB tags, and performing, by the TLB prefetcher based on the received feedback, one of changing the prefetch-distance, invalidating the TLB entry, or stopping sending of TLB prefetches to certain TLB hierarchies.

In implementations, for the changing, the method further includes linearly increasing the prefetch-distance when a counter has reached a threshold due to the received feedback being positive reinforcement with respect to the sent TLB prefetches. In implementations, for the changing, the method further includes exponentially increasing the prefetch-distance when a counter has reached a threshold due to the received feedback being positive reinforcement with respect to the sent TLB prefetches. In implementations, for the changing, the method further includes determining, by the TLB prefetcher, when a counter has reached a threshold due to the received feedback being positive reinforcement with respect to the sent TLB prefetches, determining, by the TLB prefetcher, whether the prefetch-distance is less than a maximum allowed threshold when the counter reaches the threshold, determining, by the TLB prefetcher, whether the prefetch-distance is less than an exponential threshold when the prefetch-distance is below a maximum allowed prefetch-distance, linearly increasing, by the TLB prefetcher, the prefetch-distance when the prefetch-distance is less than the exponential threshold, determining, by the TLB prefetcher, whether twice the prefetch-distance is less than the maximum allowed prefetch-distance when the prefetch-distance reaches the exponential threshold, setting, by the TLB prefetcher, the prefetch-distance to the twice the prefetch-distance when the prefetch-distance is less than the maximum allowed prefetch-distance, setting, by the TLB prefetcher, the prefetch-distance to the maximum allowed prefetch-distance when the twice the prefetch-distance at least reaches the maximum allowed prefetch-distance, and resetting, by the TLB prefetcher, the counter. In implementations, the method further includes increasing the counter when a count is less than the threshold and forego increasing the prefetch-distance when the maximum allowed prefetch-distance has been reached. In implementations, the method further includes increasing the prefetch-distance when the received feedback from the miss queues is positive reinforcement with respect to the sent TLB prefetches. In implementations, for the invalidating, the method further includes invalidating the TLB entry when the received feedback from a TLB is negative reinforcement with respect to the sent TLB prefetches. In implementations, for the stopping, the method further includes stopping sending TLB prefetches when the received feedback from the TLB is negative reinforcement with respect to the sent TLB prefetches. In implementations, the method further includes for the invalidating, the method further includes tracking using the received feedback whether sent TLB prefetches are a hit or a miss in a TLB tag lookup and invalidating, by the TLB prefetcher, the TLB entry when a counter for the received feedback is greater than a threshold number of hits. In implementations, the method further includes aging-out a trained TLB entry for a new stream when a number of non-matching TLB demand requests received by the TLB prefetcher exceed a programmable threshold set for the trained TLB entry.

In implementations, a translation lookaside buffer (TLB) prefetcher includes one or more trained TLB entries for each TLB in at least a two-level TLB hierarchy, the TLB prefetcher configured to send a number of TLB prefetches to at least one TLB level of the two-level TLB hierarchy, receive feedback, from at least one miss queue associated with a TLB of the at least two-level TLB hierarchy, as to whether sent TLB prefetches and TLB demand requests match established miss queue entries, and from at least one TLB of the at least two-level TLB hierarchy, as to whether the sent TLB prefetches and the demand requests match TLB tags, and perform at least one of change a prefetch-distance of the TLB entry based on the received feedback, invalidate the TLB entry based on the received feedback, or stop sending TLB prefetches to one or more TLB levels of the two or more TLB levels based on the received feedback.

In implementations, the method further includes to change the prefetch-distance the TLB prefetcher is configured to linearly increase the prefetch-distance when a counter has reached a threshold due to the received feedback being positive reinforcement with respect to the sent TLB prefetches, or exponentially increase the prefetch-distance when a counter has reached a threshold due to the received feedback being positive reinforcement with respect to the sent TLB prefetches. In implementations, the method further includes the TLB prefetcher further configured to age-out a trained TLB entry for a new stream when a number of non-matching TLB demand requests received by the TLB prefetcher exceed a programmable threshold set for the trained TLB entry.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration.

Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A processing system, comprising:
    two or more translation lookaside buffer (TLB) levels, each TLB level including a miss queue; and
    a TLB prefetcher connected to each of the two or more TLB levels, the TLB prefetcher configured to:
        receive feedback from the miss queue at each TLB level for previously sent TLB prefetches;
        control number of TLB prefetches sent for a trained TLB entry to each TLB level of the two or more TLB levels based on the feedback;
        invalidate the TLB entry when the received feedback is negative reinforcement with respect to sent TLB prefetches; and
        stop sending TLB prefetches to the one or more TLB levels when the received feedback is negative reinforcement with respect to sent TLB prefetches.

2. The processing system of claim 1, wherein the feedback includes a fullness indicator of the miss queue at each TLB level, the TLB prefetcher configured to:
    send TLB prefetches to TLB levels of the two or more TLB levels which have available miss queue entries.

3. The processing system of claim 2, wherein the fullness indicator is a relative indicator allowing the TLB prefetcher to be uninformed of an absolute size of the miss queue at each TLB level.

4. The processing system of claim 1, wherein the feedback includes a confirmation for the trained TLB entry, the confirmation indicating that a TLB demand address matches a pending TLB prefetch address, the TLB prefetcher configured to:
    send a TLB prefetch for the trained TLB entry to a first TLB level of the two or more TLB levels; and
    send another TLB prefetch for the trained TLB entry to at least a second TLB level of the two or more TLB levels.

5. The processing system of claim 4, the TLB prefetcher further configured to:
    age-out the trained TLB entry for a new stream when a number of non-matching TLB demand requests received by the TLB prefetcher exceed a programmable threshold set for the trained TLB entry.

6. The processing system of claim 1, wherein the feedback includes a confirmation for the trained entry, the confirmation indicating that the trained entry is prefetching in a proper direction, the prefetcher configured to:
    send a TLB prefetch for the trained entry to a first TLB level of the two or more TLB levels; and
    send another TLB prefetch for the trained entry to at least a second TLB level of the two or more TLB levels.

7. The processing system of claim 1, further including a TLB prefetch issue queue, the TLB prefetch issue queue enabling the TLB prefetcher to replay a TLB prefetch if miss queue entries are exhausted, miss in a page table cache, miss in view of a resource check, or miss in view of a hazard check prior to completion of sending the TLB prefetch.

8. The processing system of claim 7, wherein the TLB prefetcher can replay the TLB pre fetch by performing one of:
    converting on-the-fly the TLB prefetch from one TLB level to another TLB level; and
    replaying the TLB prefetch from the prefetch issue queue.

9. The processing system of claim 7, wherein the prefetch issue queue includes dedicated prefetch slots for each cache level.

10. The processing system of claim 1, wherein the TLB prefetcher comprises:
    a state machine configured to establish trained entries in the TLB prefetcher, each entry having a base address and a stride; and
    a forgiveness counter to track number of stride mismatches resulting from TLB demand requests,
    wherein the state machine is configured to control moving from a trained state to a non-trained state for a trained entry when the forgiveness counter exceeds a stride mismatch threshold.

11. The processing system of claim 1, wherein the TLB prefetcher comprises:
    a TLB hit counter for each TLB level, each TLB hit counter tracks number of TLB prefetches sent for a trained entry that hit a TLB established by a TLB demand request,
    wherein the TLB prefetcher is configured to stop sending TLB prefetches for the trained entry when the TLB hit counter exceeds a TLB hit threshold for the associated TLB level.

12. The processing system of claim 1, wherein the TLB prefetcher comprises:
    a TLB hit counter for each TLB level, each TLB hit counter tracks number of TLB prefetches sent for a trained entry that hit a TLB established by a demand request,
    wherein the TLB prefetcher is configured to invalidate the trained entry for an associated TLB level when the TLB hit counter exceeds a TLB hit threshold for the associated TLB level.

13. The processing system of claim 1, wherein the TLB prefetcher comprises:
    a first level TLB miss queue confirmation or hit-counter for a first level TLB, the first level TLB miss queue confirmation or hit-counter counts number of TLB demand requests for a trained entry that hit a miss queue entry established by first level TLB prefetches or counts number of first level TLB prefetch requests for a trained entry that hit a miss queue entry established by a TLB demand, wherein a first level TLB miss queue hit event is generated when the first level TLB miss queue confirmation or hit-counter exceeds a first level TLB miss queue hit threshold; and a higher level TLB miss queue hit-counter for each higher level TLB, each higher level TLB miss queue hit-counter counts number of hits by the first level TLB prefetches that hit a higher level TLB miss queue entry established by higher level TLB prefetches that hit an entry established by lower level TLB prefetches, wherein a higher level TLB miss queue hit event is generated when the higher level TLB miss queue hit-counter exceeds a higher level TLB miss queue hit threshold, wherein an aggressiveness of the TLB prefetcher is increased upon occurrence of either the first level TLB miss queue hit event or the higher level TLB miss queue hit event.

14. The processing system of claim 1, wherein to invalidate the TLB entry the TLB prefetcher is configured to:
track using the received feedback whether a sent TLB prefetch is a hit or a miss in a TLB tag lookup; and
invalidate the TLB entry when a counter for the received feedback is greater than a threshold number of hits.

15. A method for sending translation lookaside buffer (TLB) prefetches, the method comprising:
receiving, by a TLB prefetcher from miss queues at each TLB level of a multi-level TLB hierarchy, feedback for previously sent TLB prefetches;
controlling, by the TLB prefetcher, number of TLB prefetches sent for a trained entry to two or more TLB levels in the multi-level TLB hierarchy based on the feedback;
invalidate the TLB entry when the received feedback is negative reinforcement with respect to sent TLB prefetches; and
stop sending TLB prefetches to the one or more TLB levels when the received feedback is negative reinforcement with respect to sent TLB prefetches.

16. The method of claim 15, wherein:
the feedback includes a fullness indicator of the miss queues at each TLB level, and wherein the fullness indicator is a relative indicator allowing the TLB prefetcher to be uninformed of an absolute size of the miss queue at each TLB level, the sending further comprising sending TLB prefetches to TLB levels of the multi-level TLB hierarchy which have available miss queue entries; and
the feedback includes a confirmation for the trained entry, the confirmation indicating that a TLB demand address matches a pending TLB prefetch address, the method further comprising sending a TLB prefetch for the trained entry to a first level TLB of the multi-level TLB hierarchy, and sending another TLB prefetch for the trained entry to at least a second TLB level of the multi-level TLB hierarchy.

17. The method of claim 15, further comprising:
establishing, by a state machine in the TLB prefetcher, trained entries, each entry having a base address and a stride;
counting, by a forgiveness counter in the TLB prefetcher, number of stride mismatches resulting from TLB demand requests for a trained entry; and
moving from a trained state to a non-trained state for the trained entry when the forgiveness counter exceeds a stride mismatch threshold.

18. A processing system, comprising:
two or more translation lookaside buffer (TLB) levels, each TLB level including a miss queue; and
a TLB prefetcher connected to each of the two or more TLB levels, the TLB prefetcher configured to:
send a number of TLB prefetches to at least one TLB level of the two or more TLB levels;
receive feedback from miss queues as to whether sent TLB prefetches and TLB demand requests match established miss queue entries, and feedback from the TLB level as to whether the sent TLB prefetches and the TLB demand requests match TLB tags; and
perform at least one of:
change a prefetch-distance of a TLB entry based on the received feedback;
invalidate the TLB entry based on the received feedback; or
stop sending TLB prefetches to one or more TLB levels of the two or more TLB levels based on the received feedback.

19. The processing system of claim 18, wherein to change the prefetch-distance the TLB prefetcher is configured to perform at least one of:
linearly increase the prefetch-distance when a counter has reached a threshold due to the received feedback being positive reinforcement with respect to sent TLB prefetches; and
exponentially increase the prefetch-distance when a counter has reached a threshold due to the received feedback being positive reinforcement with respect to sent TLB prefetches.

20. The processing system of claim 18, the TLB prefetcher configured to:
determine whether a counter has reached a threshold due to the received feedback being positive reinforcement with respect to sent TLB prefetches;
determine whether the prefetch-distance is less than a maximum allowed threshold when the counter reaches the threshold;
determine whether the prefetch-distance is less than an exponential threshold when the prefetch-distance is below a maximum allowed prefetch-distance;
linearly increase the prefetch-distance when the prefetch-distance is less than the exponential threshold;
determine whether twice the prefetch-distance is less than the maximum allowed prefetch-distance when the prefetch-distance reaches the exponential threshold;
set the prefetch-distance to twice the prefetch-distance when the prefetch-distance is less than the maximum allowed prefetch-distance;
set the prefetch-distance to the maximum allowed prefetch-distance when the twice the prefetch-distance at least reaches the maximum allowed prefetch-distance; and
reset the counter.

21. The processing system of claim 20, the TLB prefetcher configured to:
increase the counter when a count is less than the threshold;
increase the prefetch-distance when the received feedback from the miss queues is positive reinforcement with respect to sent TLB prefetches; and
forego increasing the prefetch-distance when the maximum allowed prefetch-distance has been reached.

* * * * *